United States Patent [19]

Sugawara et al.

[11] Patent Number: 5,491,318
[45] Date of Patent: Feb. 13, 1996

[54] LASER CUTTING MACHINE

[75] Inventors: Masayuki Sugawara; Toshihiro Mori, both of Aichi, Japan

[73] Assignee: Mitsubishi Denki Kabushiki Kaisha, Tokyo, Japan

[21] Appl. No.: 178,904

[22] Filed: Jan. 7, 1994

[30] Foreign Application Priority Data

Mar. 25, 1993 [JP] Japan .................... 5-066625

[51] Int. Cl.$^6$ ................................ B23K 26/00
[52] U.S. Cl. ................ 219/121.67; 219/121.83
[58] Field of Search .................... 219/121.6, 121.61, 219/121.62, 121.67, 121.72, 121.81, 121.83; 361/91; 340/679, 680; 372/38; 364/474.08, 551.02

[56] References Cited

U.S. PATENT DOCUMENTS

| | | | |
|---|---|---|---|
| 3,826,578 | 7/1974 | King et al. | 219/121.74 |
| 5,155,328 | 10/1992 | Ikawa | 219/121.83 |
| 5,206,473 | 4/1993 | Suzuki et al. | 219/121.83 |
| 5,293,024 | 3/1994 | Sugahara et al. | 219/121.67 |

FOREIGN PATENT DOCUMENTS

| | | | |
|---|---|---|---|
| 3-490 | 1/1991 | Japan . | |
| 3-133589 | 5/1991 | Japan | 219/121.62 |
| 4-94883 | 3/1992 | Japan | 219/121.83 |

OTHER PUBLICATIONS

H. Kall, u.a., "Licht als Werkzeug", In: :Interface, 1990, v. 4, p. 8.

*Primary Examiner*—Geoffrey S. Evans
*Assistant Examiner*—Gregory L. Mills
*Attorney, Agent, or Firm*—Sughrue, Mion, Zinn, Macpeak & Seas

[57] ABSTRACT

A laser cutting machine which invalidates an alarm generated by a distance sensor during piercing, or invalidates said alarm in a first movement after piercing until a movement is made over a predetermined distance, or invalidates said alarm in a block having no movement, or keeps invalidating said alarm from a piercing start until a movement is made over a predetermined distance after piercing, or invalidates said alarm from a point a predetermined distance before a cutting end point to the cutting end point, or keeps invalidating said alarm from a point a predetermined distance before the cutting end point until a movement is made over a predetermined distance after the arrival at the cutting end point, or invalidates said alarm over a predetermined travel distance in a specified moving command block from the NC program, whereby said laser cutting machine can prevent cutting from being stopped by an unnecessary alarm generated by the alarm signal of the sensor due to scattered or accumulated spatters, the influence of plasma, or inclination of a workpiece or contact with a piece of the workpiece which has blown away at the cutting end point, and cutting can be continued as required.

6 Claims, 16 Drawing Sheets

5: ELEVATION BODY
9: LASER OSCILLATOR
10: LASER BEAM GUIDE CYLINDER
11: CONTROL APPARATUS

```
N1 M101;(PIERCING CONDITION SELECTION)
N2 M198;(COPY FUNCTION ON)
N3 M120;(PIERCING EXECUTION)
N4 M102;(CUTTING CONDITION SELECTION)
N5 G1X100.Y100.;(X,Y AXIS MOVEMENT)

N98 G1X10.Y10.;(X,Y AXIS MOVEMENT)
N99 M121;(CUTTING END PROCESSING EXECUTION)
```

LASER CUTTING MACHINE

BACKGROUND OF THE INVENTION

1. Field of the Invention

The present invention relates to a laser cutting machine equipped with a sensor which measures a distance between a cutting head and a workpiece.

2. Description of the Background Art

FIG. 16 illustrates a conventional configuration of a laser cutting machine, having a base 1 for a cutting table, a table bed 2 movable in a linear direction on the base 1 (this linear axis is defined here as an X axis), a motor 3 which moves the table bed 2 in the X axis direction, a table 4 which can be moved in an orthogonal direction to the X axis by a motor, not shown, on the table bed 2 (this linear axis is defined here as a Y axis), an elevation body 5 which moves up and down in a direction orthogonal to the X and Y axes, respectively (this elevating axis is defined here as a Z axis), a cover 6 designed to protect the elevation body 5, a cutting head 7 fitted to the front end of the elevation body 5, a frame body 8 which supports the Z axis part, a laser oscillator 9 which outputs a laser beam, a laser beam guide cylinder 10, a laser cutting machine control apparatus 11 which accommodates a numerical control (NC) apparatus consisting of an interface with external signals, a CPU, memory, etc., and a workpiece 12.

The laser beam is output from the laser oscillator 9, guided through the laser beam guide cylinder 10, gathered by a lens in the cutting head 7, and applied to the workpiece 12 loaded on the table 4. At this time, a cutting gas is injected simultaneously. The laser cutting machine control apparatus 11 drives the X, Y and Z axes to move the relative positions of the cutting head and the table 4 and controls the laser beam output, etc., to cut the workpiece into a desired shape.

Also, in laser cutting, the focal point of the laser beam gathered by the lens must be set to a proper position relative to the workpiece 12. For this purpose, the cutting head 7 is fitted with a sensor which measures a distance between the cutting head and the workpiece to provide the laser cutting machine with a function which judges the excess of this signal data over a predetermined range or generates a signal indicating the contact of the head with the workpiece as improper and gives an alarm. Further, the laser cutting machine often has a copy function which moves the position of the cutting head 7 or the lens up/down under the control of the sensor signal to automatically set the focal point relative to the workpiece to a predetermined position.

FIG. 17 illustrates a conventional arrangement for a cutting control including the alarm detection function and the copy function, a main control section 13, a cutting machine control section 14, a position control section 15 and an alarm control section 16, in the numerical control (NC). Additionally, FIG. 17 illustrates a copy control section 17, a sensor data processor 18, a sensor 19 which measures a distance L, X axis servo control 20, Y axis servo control 21, Z axis servo control 22, servo motors 23, 24, 25 with position detectors of the X, Y and Z axes respectively. An apparatus 26 consisting of a laser oscillator, a whole cutting table and an alarm display 27 are also shown in FIG. 17.

Control exercised in accordance with an NC program to cut the workpiece will be described with reference to FIG. 17. The main control section 13 analyzes the cutting NC program on a block-by-block basis and gives information corresponding to program commands to the subsequent control sections. When the program commands are those given to the laser oscillator and cutting table, e.g., the on/off of the laser beam, cutting gas and workpiece clamp, the command information is given to the cutting machine control section 14. The cutting machine control section sends signals to the laser oscillator and cutting table 26 according to the command information. The laser oscillator and cutting table 26 are caused to execute laser beam output on/off, cutting gas solenoid valve on/off, etc., under the control of the command signals. Reversely, the signals of limit switches, various sensors, etc., from the laser oscillator and cutting table 26 are transmitted to the main control section 13 via the cutting machine control section 14, whereby the control apparatus is given the information on the status of the laser oscillator and cutting table 26.

When the program command is a position command, the main control section 13 gives the position control section 15 information such as a move position and travel speed. According to the information given, the position control section 15 calculates a travel distance, distributes it to the X and Y axes, and outputs travel commands to the servo control sections 20, 21. At the same time, the position control section 15 controls an actual position, etc., according to the travel output relative to the commanded travel distance, the remaining travel distance, and the information from the servo control sections. The servo control sections 20, 21 drive the servo motors 23, 24 to relatively move the cutting head 7 with respect to the workpiece. In this manner, the cutting head moves according to the shape defined by the program to cut the workpiece. Conversely, the position control section 15 transmits the information, such as the position, the output travel and the remaining travel distance, to the main control section 13.

The control of the copy function will now be described. When the program command is a copy function on/off command, the main control section 13 gives command information to the copy control section 17. When given a copy function ON command, the copy control section 17 compares information on the distance L input from the sensor data processor 18 with a preset predetermined distance and outputs a travel signal to the Z axis servo control section 22 to eliminate a difference therebetween. The servo control section 22 drives the servo motor 25 to move the cutting head 7 vertically. Among various types of sensors, the distance sensor 19 shown in the drawing is of a capacitance type. The sensor 19 outputs a signal corresponding to the distance L between the nozzle and the workpiece 12, and the sensor signal is fed back to the copy control section 17 via the sensor data processor 18. In this manner, when the distance L changes due to the distortion or the like of the workpiece, the sensor data changes and the Z axis position changes according to the change of the sensor data to keep the distance between the cutting head and the workpiece preset and predetermined. Conversely, the copy control section 17 transmits the copy status information to the main control section 13.

The control of the alarm detection function will now be described. When the signal received from the sensor 19 has exceeded a predetermined range or indicates contact of the head with the workpiece, the sensor data processor 18 judges that the positional relationship between the cutting head 7 and the workpiece 12 is unsatisfactory and gives an alarm signal to the alarm control section 16. Receiving the alarm signal, the alarm control section 16 informs the main control section 13 of the alarm, demands that cutting should be stopped, and displays the alarm on the alarm display 27. When the alarm is input, the main control section 13 stops the execution of the cutting program, commands the cutting machine control section 14 to switch off the laser beam, etc., commands the position control section 15 to stop axis movement, and commands the copy control section 17 to switch off copying. FIG. 18 is an alarm generation processing flowchart. In step S1, it is judged whether or not the signal from the sensor has exceeded the predetermined range or indicates an alarm such as contact with the workpiece. When the signal is the alarm signal, the alarm is generated in step S2.

In addition to the above program commands, the main control section 13 processes a subprogram call command, a cutting condition switching command and other commands according to the contents of the NC program, gives information to the corresponding control sections as required, and also receives information, such as command execution completion, from the corresponding control sections.

FIG. 19 illustrates an example of a conventional cutting program. When a piercing condition selection command is provided in block 1, the laser output of the laser oscillator, the cutting gas pressure electro-pneumatic proportioning valve of the cutting table, and the like are set to the given piercing conditions through the processing of the main control section 13 and the cutting machine control section 14 of FIG. 17. When a copy function ON command is provided in block 2, the copy control section 17 performs processing to cause the cutting head to move until the distance L from the workpiece reaches a preset piercing distance and thereafter move to maintain the preset distance. When the preset distance is reached, the main control section 13 executes a piercing command in next block 3 to transmit the start of piercing to the cutting machine control section 14 and command it to switch the cutting gas and the laser beam on. This causes the laser oscillator to switch on the laser beam and the cutting table to open a cutting gas solenoid valve, whereby boring at the start of cutting (piercing) is initiated. When a sensor provided on the cutting table 26, which is referred to as the piercing sensor, detects the completion of boring (that a hole has passed through the workpiece) the sensor transmits this information to the cutting machine control section 14, which then informs the main control section 13 of the piercing completion. On completion of piercing, block 4 is executed. In block 4, the laser output, etc., are set to cutting conditions. The preset copy distance is also switched to a cutting distance. When a move position command is given in block 5, the position control section performs processing to move the cutting head in the X and Y directions. Hereafter, a cutting condition change, a position movement and other commands are given up to block 98 and the workpiece is cut into a required shape under the commands. When a cutting end command is given in block 99, the main control section 13 commands the cutting machine control section to switch the cutting gas and the laser beam off. This ends a sequence of cutting, subsequently the position is moved, and the next cutting begins again with piercing.

The conventional laser cutting machine arranged as described above results in an alarm and stops cutting when information indicating the alarm of the sensor signal is given by the sensor data processor 18. However, the alarm signal from the sensor may be output when it is not required to stop cutting. For instance, the alarm signal may be provided by the sensor due to plasma, scattered spatters, workpiece projections, or accumulated spatters produced during boring at the start of cutting. Also, the alarm signal may be given when the workpiece cut is inclined or blown away at a cutting end point to affect the sensor. In such cases where cutting need not be stopped, the alarm was given to stop cutting.

FIG. 20 illustrates examples wherein the alarm signal is output although cutting need not be stopped. FIG. 21(*a*) shows that plasma 28 has been generated during piercing. In this case, the sensor, which cannot measure the distance L accurately due to the influence of the plasma, may output the alarm signal to generate an alarm during piercing. FIG. 21(*b*) shows that projection-like thin deformations have been produced in the periphery of a hole bored during piercing. In this case, the sensor outputs the alarm signal which indicates approach to or contact with the workpiece because of the influence of projections 29 during piercing or at the time of movement after piercing to generate the alarm. FIG. 21(*c*) shows that spatters have accumulated in the periphery of the hole during piercing. In this case, the sensor gives the alarm signal which indicates approach to or contact with the workpiece due to the influence of accumulations 30 at the time of movement after piercing to generate the alarm. FIG. 21(*d*) shows that the workpiece cut off has inclined. In this case, the sensor outputs the alarm signal which indicates approach to or contact with the workpiece 31 at the end of cutting to generate the alarm.

To cope with these problems, there is a method as in Japanese Laid-Open Patent Publication No. HEI 3-490 wherein the signals from the sensor are all obstructed during piercing, etc., so that they are not given to the control sections, whereby copy control is not exercised. However, this method does not provide an alarm and does not allow the copy function to be used, either. But, some types of cutting may be difficult if the copy function cannot be used. These include cutting methods where the set distance of the copy function is changed in small increments during piercing to lower or raise the cutting head little by little in order to drive the focal point of the laser beam into, or away from, the workpiece. Also, a cutting method wherein the set distance of the copy function is changed immediately after piercing to switch the cutting head height between cutting and piercing may be difficult if the copy function cannot be used. Since these cutting methods cannot be employed if the copy function is not executed, there is a problem that a cutting fault will occur. When the copy function is being implemented, an unauthorized signal is output from the sensor, which is often instantaneous.

FIG. 20 illustrates a sensor signal where an alarm signal is output due to plasma or spatters during piercing. As shown in this drawing, an alarm signal of short duration is often generated randomly. Since the duration is too short in this case to respond to the sensor signal at the response speed of the ordinary copy function, there is no problem in cutting if the copy function is implemented. Also, when the copy function is not executed in the case where spatters are accumulated as shown in FIG. 21(*c*), the cutting head does not rise relative to the accumulation at all, whereby when the cutting head front end passes the accumulation portions, it interferes with the accumulation, incurring damage to the workpiece and/or the cutting head. Further, if the accumulation closes up the hole at the front end of the cutting head where the laser beam passes, a cutting fault will occur and the scattered spatters will stick to the inner lens directly through the hole in the cutting head, causing the lens to deteriorate. Also, when the copy function is not performed in the case where the inclined workpiece approaches or contacts the cutting head, as in FIG. 21(*d*), the cutting head will easily interfere with the workpiece.

It is, accordingly, an object of the present invention to overcome said disadvantages by providing a laser cutting machine which does not give an unnecessary alarm so that the copy function can be used and cutting can be continued without being stopped.

SUMMARY OF THE INVENTION

A laser cutting machine according to a first embodiment includes a laser oscillator, an optical condenser system for directing a laser beam output from said laser oscillator on a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, with a piercing checking means for checking that said laser cutting machine is piercing and alarm signal invalidating means for invalidating said alarm signal.

A laser cutting method, referred to herein as a second embodiment according to the invention, for cutting the workpiece concurrently with the measurement of the distance between the cutting head and the workpiece using the distance measuring means in the laser cutting machine of the first embodiment, has the steps of: (1) checking whether the machine is piercing or not by means of the piercing checking means; (2) when the machine is piercing, invalidating the alarm signal from the alarm signal output section by means of the alarm signal invalidating means to keep the alarm from being displayed on the alarm display section and to continue cutting; and (3) when the machine is not piercing, displaying the alarm signal from the alarm signal output section on the alarm display section and stopping the cutting.

A laser cutting machine of a third embodiment has a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, with a block checking means for checking that said laser cutting machine is moving in a first moving block after the completion of piercing, a distance condition judging section for judging whether or not a current cutting point has moved a preset distance from a specific point on said workpiece, and alarm signal invalidating means for invalidating said alarm signal.

A laser cutting method of a fourth embodiment cuts the workpiece concurrently with the measurement of the distance between the cutting head and the workpiece using the distance measuring means in the laser cutting machine of the third embodiment, with the steps of: (1) checking whether the machine is moving in the first moving block after the completion of piercing by means of the block checking means; (2) when the machine is moving in the first moving block after the completion of piercing, judging whether a travel from a piercing point to the current cutting point is within a preset distance or not by means of the distance condition judging section; (3) when said travel is within said preset distance, invalidating the alarm signal from the alarm signal output section by means of the alarm signal invalidating means to keep the alarm from being displayed on the alarm display section and to continue cutting; and (4) when said travel has exceeded said preset distance or when the current cutting point is not in the first moving block after the completion of piercing, displaying the alarm signal from the alarm signal output section on the alarm display section and stopping the cutting.

A laser cutting machine of a fifth embodiment includes a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, with a stop checking means for checking that said laser cutting machine is in a program block having no move command and alarm signal invalidating means for invalidating said alarm signal.

A laser cutting method constituting a sixth embodiment cuts the workpiece concurrently with the measurement of the distance between the cutting head and the workpiece using the distance measuring means in the laser cutting machine of the fifth embodiment, and includes the steps of: (1) checking whether the machine is in the block having no movement by means of the stop checking means; (2) when the machine is in the block having no movement, invalidating the alarm signal from the alarm signal output section by means of the alarm signal invalidating means to keep the alarm from being displayed on the alarm display section and to continue cutting; and (3) when the machine is not in the block having no movement, displaying the alarm signal from the alarm signal output section on the alarm display section and stopping the cutting.

A laser cutting machine of a seventh embodiment includes a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, and has a piercing checking means for checking that said laser cutting machine is piercing, block checking means for checking that said laser cutting machine is moving in a first moving block after the completion of piercing, a distance condition judging section for judging whether or not a current cutting point has moved a preset distance from a specific point on said workpiece, and alarm signal invalidating means for invalidating said alarm signal.

A laser cutting method constituting an eighth embodiment cuts the workpiece concurrently with the measurement of the distance between the cutting head and the workpiece using the distance measuring means in the laser cutting machine of the seventh embodiment, and has the steps of: (1) checking whether the machine is piercing by means of the piercing checking means; (2) if the machine is not piercing, checking whether the machine is in the first moving block after the completion of piercing by means of the block checking means; (3) further, if the machine is in the first moving block after the completion of piercing, judging whether travel from a piercing point to the current cutting point is within a preset distance by means of the distance condition judging section; (4) when the laser cutting machine is piercing or is moving in the first moving block after the completion of piercing and said travel is within said preset distance, invalidating the alarm signal from the alarm signal output section by means of the alarm signal invalidating means to keep the alarm from being displayed on the alarm display section and to continue cutting; and (5) when the machine is not piercing and is moving in the first moving block after the completion of piercing and said travel has exceeded said preset distance or the current cutting point is not in the first moving block after the completion of piercing, displaying the alarm signal from the alarm signal output section on the alarm display section and stopping the cutting.

A laser cutting machine of a ninth embodiment includes a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, having block checking means for checking that said laser cutting machine is moving in a moving block immediately before the completion of cutting, a distance condition judging section for judging whether or not a current cutting point is within a preset distance from a specific point on said workpiece, and alarm signal invalidating means for invalidating said alarm signal.

A laser cutting method constituting a tenth embodiment cuts the workpiece concurrently with the measurement of the distance between the cutting head and the workpiece using the distance measuring means in the laser cutting machine of the ninth embodiment, and has the steps of: (1) checking whether the machine is moving in the moving block immediately before the completion of cutting by means of the block checking means; (2) when the machine is moving in the moving block immediately before the completion of cutting, judging whether travel from a cutting completion point to the current cutting point is within a preset distance by means of the distance condition judging section; (3) when said travel is not more than said preset distance, invalidating the alarm signal from the alarm signal output section by means of the alarm signal invalidating means to keep the alarm from being displayed on the alarm display section and to continue cutting; and (4) when said travel has exceeded said preset distance or when the current cutting point is not in the moving block immediately before the completion of cutting, displaying the alarm signal from the alarm signal output section on the alarm display section and stopping the cutting.

A laser cutting machine of an eleventh embodiment, includes a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, and has block checking means for checking that said laser cutting machine is moving in a moving block immediately before the completion of cutting, block checking means for checking that said laser cutting machine is moving in a moving block immediately after the completion of cutting, a distance condition judging section for judging whether or not a current cutting point is within a preset distance from a specific point on said workpiece, and alarm signal invalidating means for invalidating said alarm signal.

A laser cutting method constituting a twelfth embodiment cuts the workpiece concurrently with the measurement of the distance between the cutting head and the workpiece using the distance measuring means in the laser cutting machine of the eleventh embodiment, and has the steps of: (1) checking whether the machine is moving in the moving block immediately before the completion of cutting by means of the block checking means; (2) when the machine is moving in the moving block immediately before the completion of cutting, judging whether travel from a cutting completion point to the current cutting point is within a preset distance by means of the distance condition judging section; (3) when the machine is not moving in the moving block immediately before the completion of cutting, further judging whether the machine is moving in the moving block immediately after the completion of cutting by means of said checking means; (4) when the machine is moving in the moving block immediately after the completion of cutting, judging whether travel from the cutting completion point to the current cutting point is within the preset distance by means of the distance condition judging section; (5) when said travel in said block immediately before the completion of cutting is not more than said preset distance or when said travel in said block immediately after the completion of cutting is not more than said preset distance, invalidating the alarm signal from the alarm signal output section by means of the alarm signal invalidating means to keep the alarm from being displayed on the alarm display section and to continue cutting; and (6) when said travel has exceeded said preset distance or when the current cutting point is not in the moving block immediately before or after the completion of cutting, displaying the alarm signal from the alarm signal output section on the alarm display section and stopping the cutting.

A laser cutting machine of a thirteenth embodiment has a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, and an alarm display section for receiving the alarm signal from said alarm signal output section and displaying an alarm, and includes block checking means for checking that said laser cutting machine is moving in a pre-specified moving block, a distance condition judging section for judging whether or not a current cutting point is within a preset distance from the end point of said moving block, and alarm signal invalidating means for invalidating said alarm signal.

A laser cutting method constituting a fourteenth embodiment cuts the workpiece concurrently with the measurement of the distance between the cutting head and the workpiece using the distance measuring means in the laser cutting machine of the thirteenth embodiment, and has the steps of:

(1) checking whether the machine is moving in the pre-specified moving block by means of the block checking means; (2) when the machine is moving in said moving block, judging whether travel from a cutting end point to the current cutting point is within a preset distance by means of the distance condition judging section; (3) when said travel is not more than said preset distance, invalidating the alarm signal from the alarm signal output section by means of the alarm signal invalidating means to keep the alarm from being displayed on the alarm display section and to continue cutting; and (4) when said travel has exceeded said preset distance or when the current cutting point is not in the pre-specified moving block, displaying the alarm signal from the alarm signal output section on the alarm display section and stopping the cutting.

A laser cutting machine of a fifteenth embodiment includes a laser oscillator, an optical condenser system for directing a laser beam output from said laser oscillator onto a workpiece, a cutting head for holding said optical condenser system therein, distance measuring means for measuring a distance between said cutting head and said workpiece, an alarm signal output section for judging the excess of the output signal of said distance measuring means over a predetermined range as an alarm state and providing an alarm signal, an alarm display section for receiving the alarm signal from said alarm signal output section and displaying an alarm, and alarm signal invalidating means for invalidating said alarm signal, with a condition setting section for setting a condition under which said alarm signal is invalidated, and a condition judging section for comparing the alarm signal invalidating condition set by said condition setting section with a signal changing according to a cutting state to judge whether said alarm signal is invalidated or not.

In a laser cutting machine of a sixteenth embodiment the condition judging section includes a judging section for judging at least one of: (1) whether a current position is being pierced or not; (2) whether or not the current position is in a block immediately after piercing and is within a preset distance from a piercing point; (3) whether or not the current position is in a block having no movement; (4) whether or not the current position is in a block immediately before the end of cutting and is within a preset distance from a cutting end point; (5) whether or not the current position is in a block immediately after the end of cutting and is within a preset distance from the cutting end point; and (6) whether or not the current position is in a block preset by the condition setting section and is within a preset distance from the end point of said preset block.

In a laser cutting machine of a seventeenth embodiment the condition setting section includes a setting section for setting as the alarm signal invalidating condition any combination of: (1) whether the laser cutting machine is piercing or not; (2) whether or not the laser cutting machine is in a block immediately after piercing and is within the preset distance from the piercing point; (3) whether or not the laser cutting machine is in a block having no movement; (4) whether or not the laser cutting machine is in a block immediately before the end of cutting and is within the preset distance from the cutting end point; (5) whether or not the laser cutting machine is in a block immediately after the end of cutting and is within the preset distance from the cutting end point; and (6) whether or not the laser cutting machine is in a block preset by the condition setting section and is within the preset distance from the end point of said preset block.

In a laser cutting machine of an eighteenth embodiment the condition setting section includes a setting section for setting as the alarm signal invalidating condition at least one of the conditions of: (1) whether the laser cutting machine is piercing or not; (2) whether or not the laser cutting machine is in the block immediately after piercing and is within the preset distance from the piercing point; (3) whether or not the laser cutting machine is in a block having no movement; (4) whether or not the laser cutting machine is in a block immediately before the end of cutting and is within the preset distance from the cutting end point; (5) whether or not the laser cutting machine is in a block immediately after the end of cutting and is within the preset distance from the cutting end point; and (6) whether or not the laser cutting machine is in a block preset by the condition setting section and is within the preset distance from the end point of said preset block.

In a laser cutting machine of a nineteenth embodiment, the condition setting section includes a distance setting section for setting four different preset distances.

DESCRIPTION OF THE PREFERRED EMBODIMENTS

Figure 1:
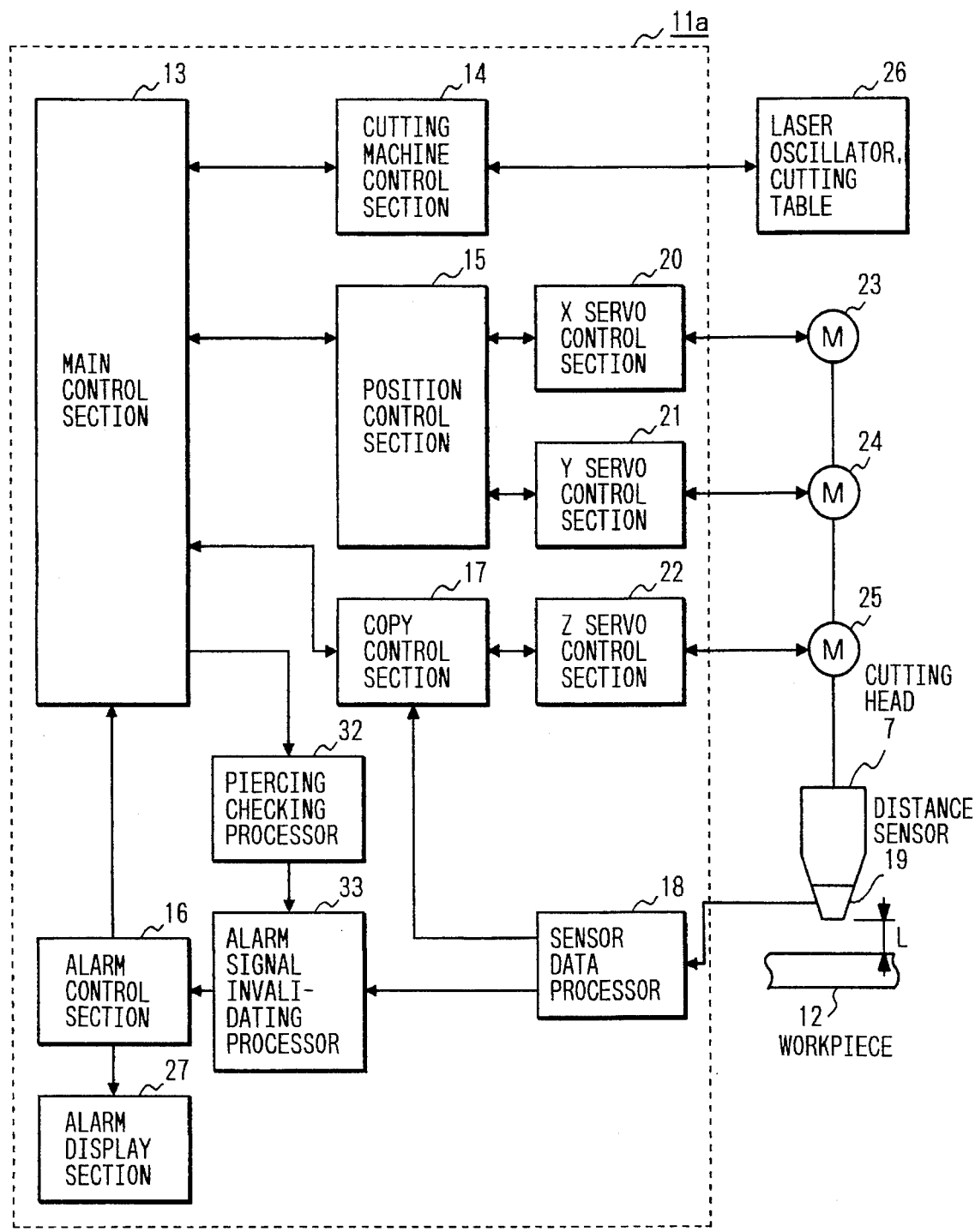
FIG. 1 is a block arrangement diagram illustrating a first embodiment of a laser cutting machine in accordance with the present invention.
Figure 17:
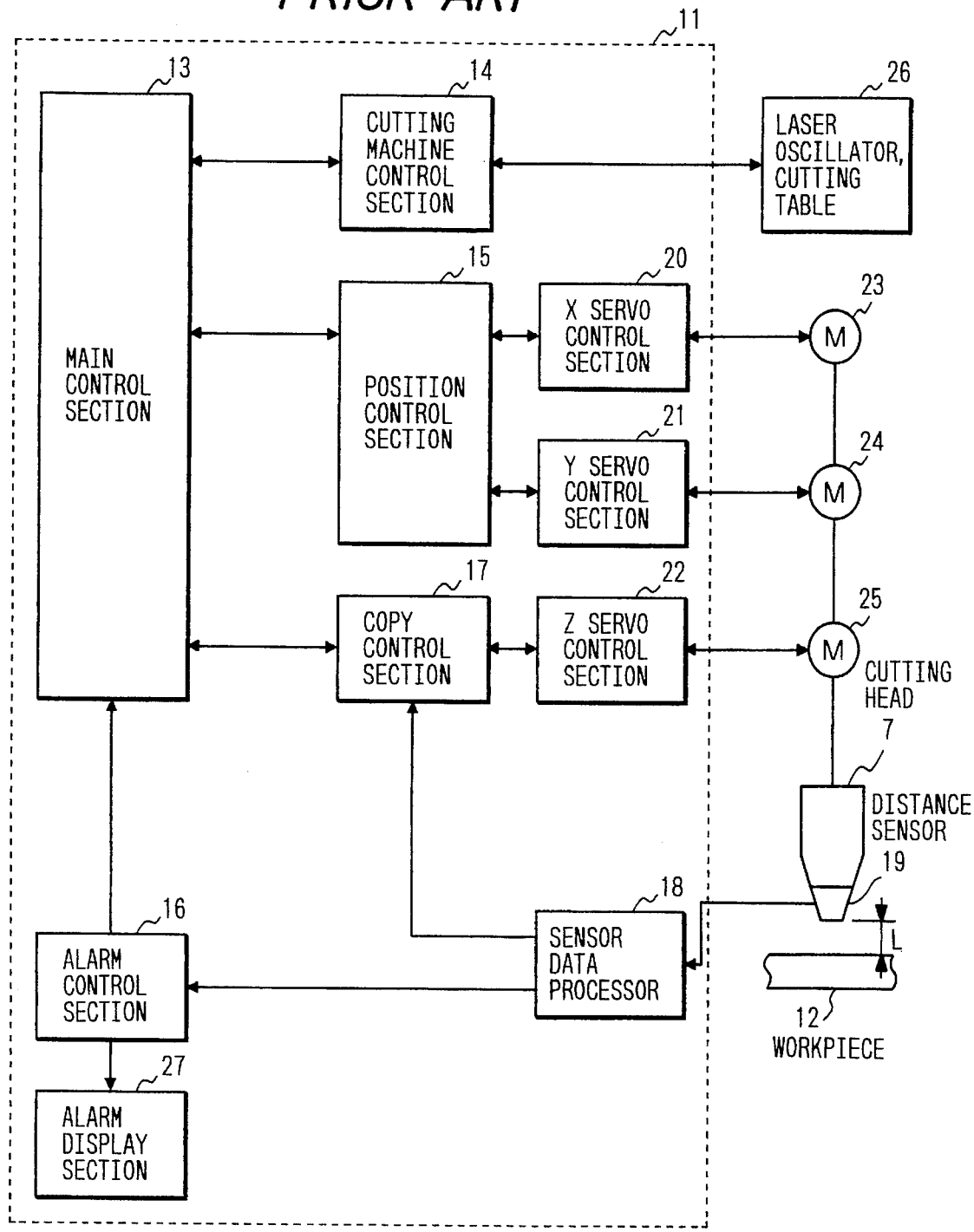
FIG. 17 is a block arrangement diagram of a laser cutting machine known in the conventional art.
Figures 18, 19:
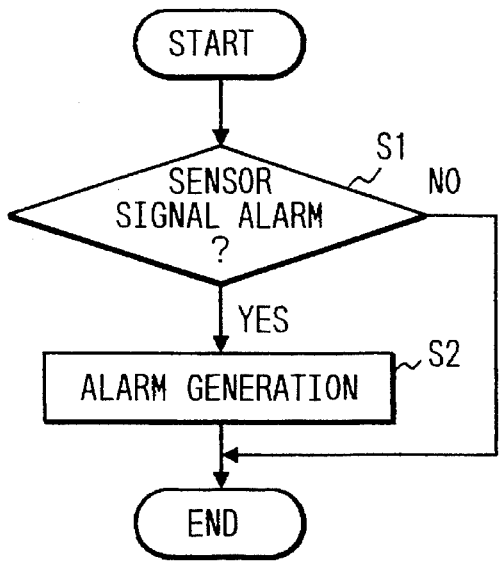
FIG. 18 is a flowchart illustrating alarm generation processing known in the conventional art.
FIG. 19 illustrates an example of a cutting program known in the conventional art.
Figure 20:
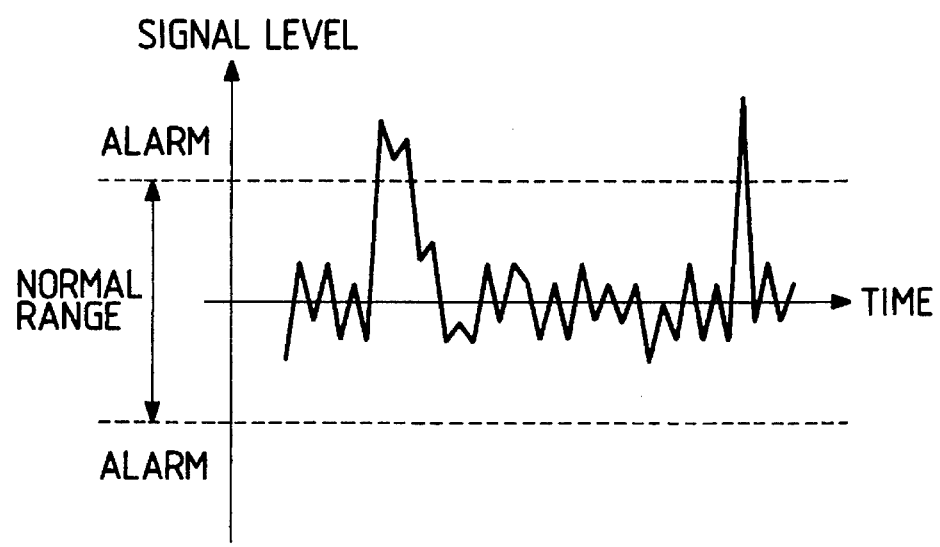
FIG. 20 is a model diagram of a sensor signal during piercing in the conventional art.
Figure 21A:
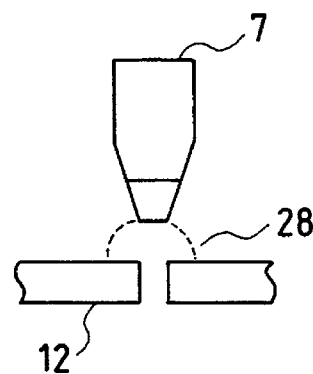
FIG. 21 illustrates examples wherein an unnecessary cutting stop alarm signal is output in the conventional art.
Figure 21B:
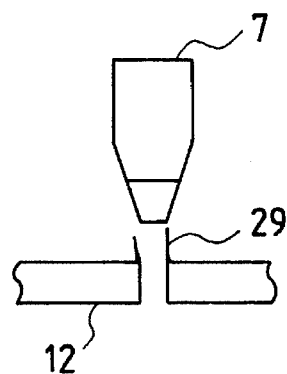
Figure 21C:
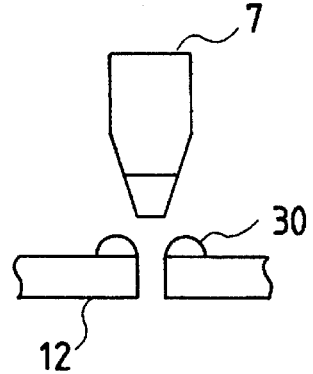
Figure 21D:
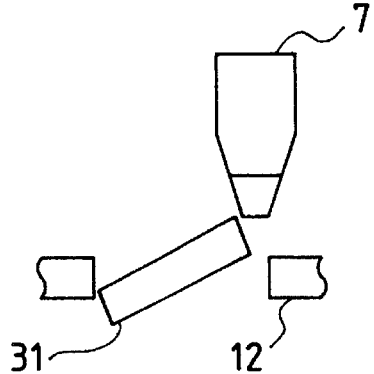

FIG. 1 is a block arrangement diagram showing a laser cutting machine of a first embodiment of the present invention. In the drawing, the numerals 7 and 12 to 27 indicate identical or corresponding parts to those in FIG. 17. A control apparatus 11a, a piercing checking processor 32, and an alarm signal invalidating processor 33 are shown. The piercing checking processor 32 receives a program command executed by the main control section 13, and if it is a piercing command, judges it as a piercing execution start. The main control section is informed of the completion of piercing by the piercing sensor through the cutting machine control section 14. The piercing checking processor 32 receives this information from the main control section and judges a period from the piercing execution start to the receipt of the piercing completion information as piercing. When piercing is being carried out, a command signal is output to the alarm signal invalidating processor 33 to invalidate the alarm signal. When receiving the alarm signal from the sensor data processor 18, the alarm signal invalidating processor 33 ordinarily gives that signal to the alarm control section 16, but while the invalidating command signal is being input, invalidates the alarm signal and does not transmit the alarm signal to the alarm control section 16. Accordingly, if the sensor data processor 18 outputs the alarm signal, the alarm control section 16 does not provide the alarm during piercing.

Figure 2:
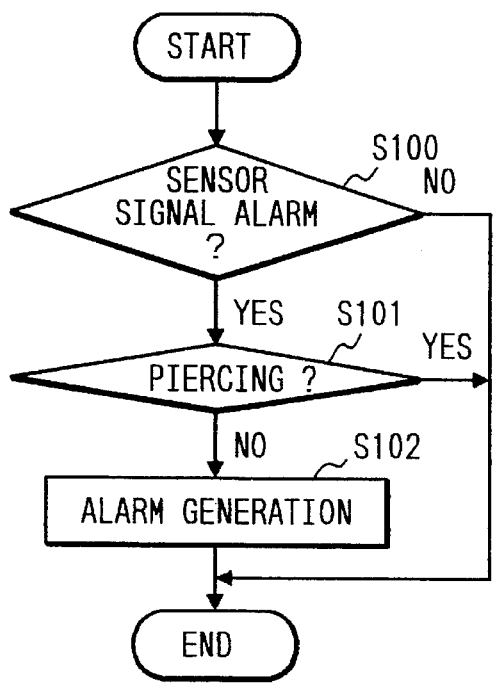
FIG. 2 is a processing flowchart for the laser cutting machine in FIG. 1.

FIG. 2 is a processing flowchart for a method wherein the alarm during piercing is invalidated in the laser cutting machine in FIG. 1. In FIG. 2, it is judged in step S100 whether or not the signal from the sensor has exceeded the predetermined range or is indicating the alarm signal because of contact with the workpiece. If it is the alarm signal, it is judged in step S101 whether piercing is being performed or not. If piercing is being executed, the alarm is not output. If piercing is not being carried out, the alarm is generated in step S102.

Figure 3:
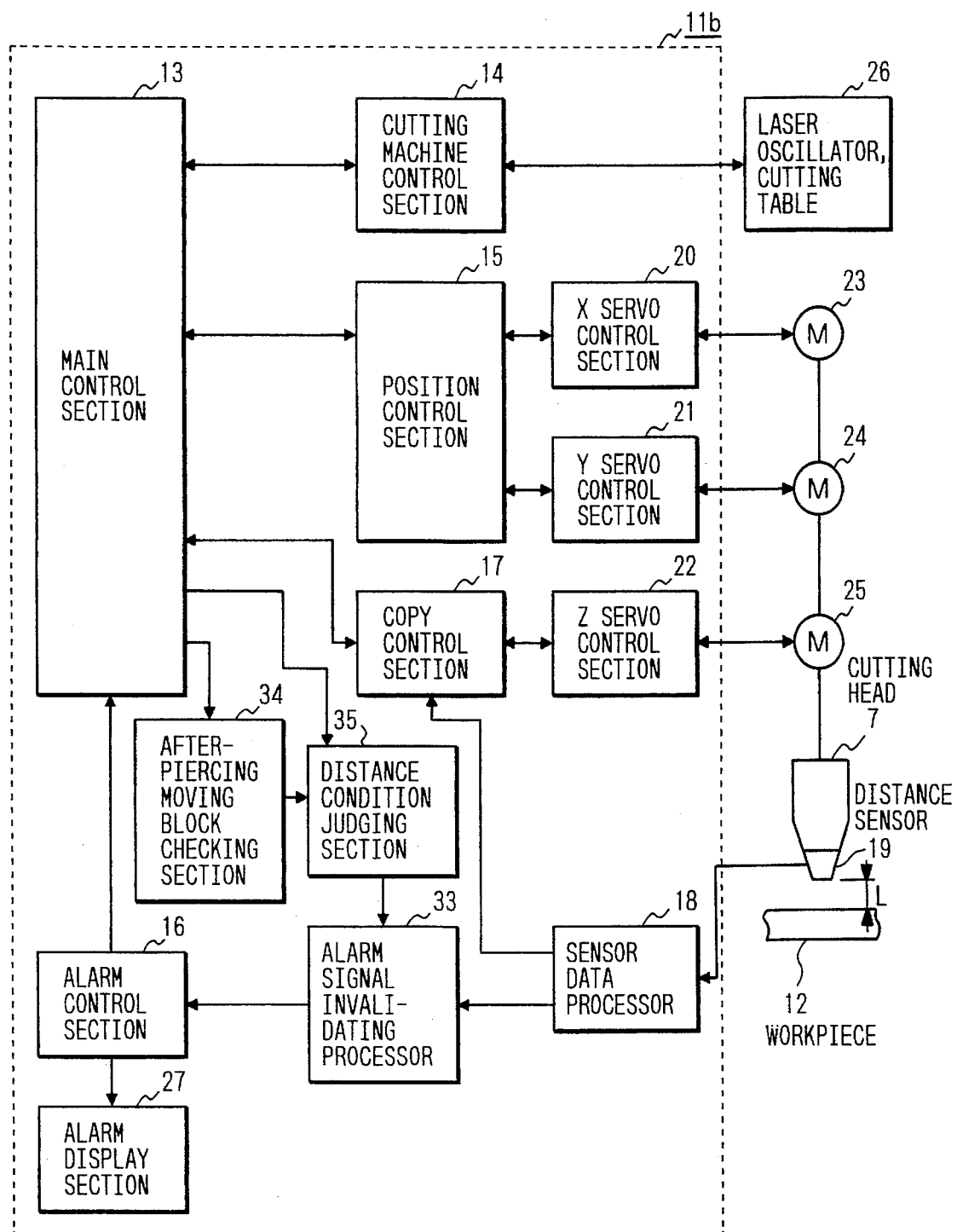
FIG. 3 is a block arrangement diagram illustrating a third embodiment for a laser cutting machine in accordance with the present invention.

FIG. 3 is a block arrangement diagram showing a laser cutting machine of a third embodiment of the present invention. The first embodiment allows the alarm generated by the detection of plasma during piercing to be invalidated. However, the alarm can be generated when the sensor outputs the alarm signal during movement immediately after piercing due to the accumulation of a large amount of spatters on the workpiece around the pierced hole. FIG. 3 shows a block arrangement which invalidates the alarm until movement is made over a predetermined distance immediately after piercing. In FIG. 3 are shown a control apparatus 11b, an after-piercing moving block checking section 34, and a distance condition judging section 35. The after-piercing moving block checking section 34 receives the command executed by the main control section 13, judges a first move command after the execution of the piercing command as a move command immediately after piercing, and outputs to the distance condition judging section 35 a signal which indicates the first moving block after piercing. When receiving said signal, the distance condition judging section 35 receives travel distance information up to the present relative to the move command from the main control section 13 and compares it with the preset distance. If the travel distance is not more than the preset distance, a command signal is output to the alarm signal invalidating processor 33 to invalidate the alarm signal. On receiving the alarm signal from the sensor data processor 18, the alarm signal invalidating processor 33 ordinarily gives that signal to the alarm control section 16, but while the invalidating command signal is being received, invalidates the alarm signal and does not transmit the alarm signal to the alarm control section 16. Accordingly, if the sensor data processor 18 outputs the alarm signal, the alarm control section 16 does not give the alarm until the movement is made over the predetermined distance immediately after piercing.

Figure 4:
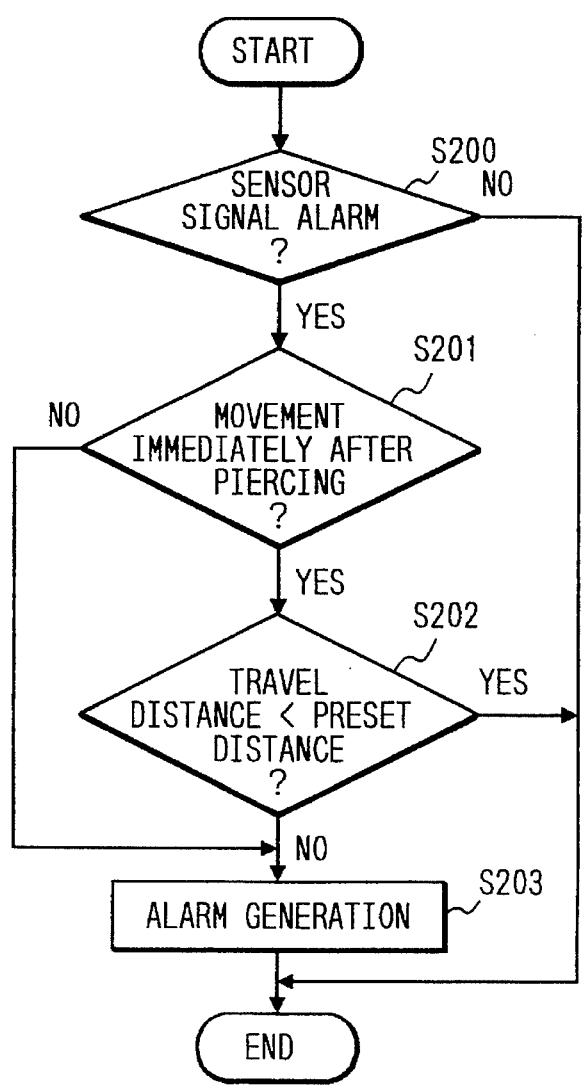
FIG. 4 is a processing flowchart for the laser cutting machine in FIG. 3.

FIG. 4 is a processing flowchart of a method wherein the alarm is invalidated until movement is made over the predetermined distance after piercing in the laser cutting machine in FIG. 3. In FIG. 4, it is judged in step S200 whether or not the signal from the sensor has exceeded the predetermined range or is indicating the alarm signal because of contact with the workpiece. If the alarm signal is present, it is judged in step S201 whether or not the present movement is that immediately after piercing. If not, the alarm is output in step S203. If so, the travel distance up to the present and the preset distance are compared in step S202. If the travel distance is equal to or longer than the preset distance, the alarm is output in step S203. If the travel distance is shorter than the preset distance, the alarm is not output.

Figure 5:
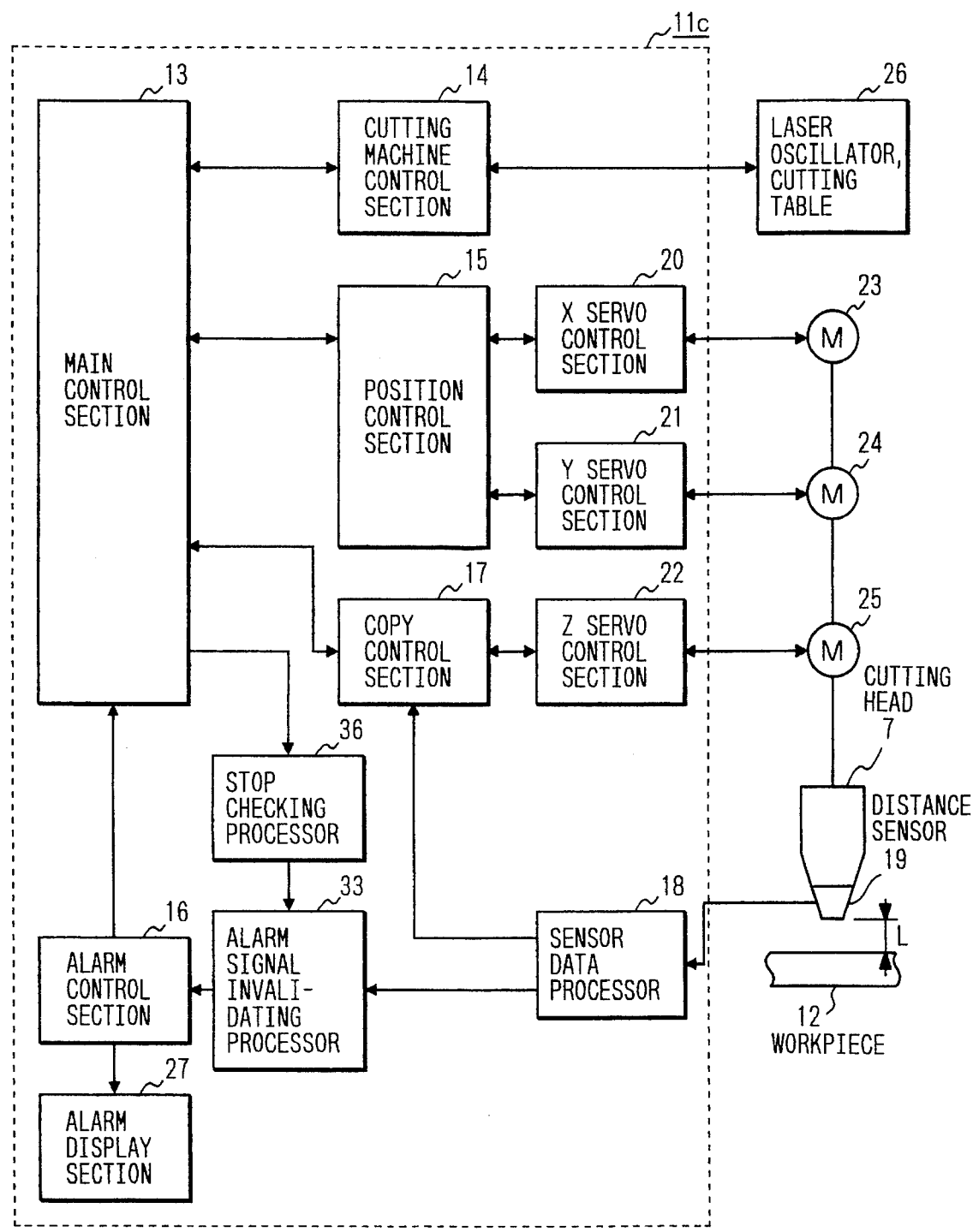
FIG. 5 is a block arrangement diagram illustrating a fifth embodiment of a laser cutting machine in accordance with the present invention.

FIG. 5 is a block diagram showing a laser cutting machine of a fifth embodiment of the present invention. If the first and the second embodiments of the present invention are executed in combination, the alarm is output as soon as a command having no movement of the X and Y axes, e.g., a cutting condition selection command or a subprogram call command, is executed between the piercing completion and the first move command when projections in the periphery of the pierced hole are making contact with the sensor. Hence, it is required to invalidate the alarm in a command block of the NC program having no movement. The fifth embodiment as shown in FIG. 5 solves this problem. As illustrated in FIG. 5, the stop checking processor 36 receives the command executed by the main control section 13, and if the command has no movement, outputs a command signal to the alarm signal invalidating processor 33 to invalidate the alarm signal. On receipt of the alarm signal from the sensor data processor 18, the alarm signal invalidating processor 33 ordinarily gives that signal to the alarm control section 16, but while the invalidating command signal is being input, invalidates the alarm signal and does not transmit the alarm signal to the alarm control section 16. Accordingly, if the sensor data processor 18 outputs the alarm signal, the alarm control section 16 does not give the alarm in the command block of the NC program having no movement.

Figure 6:
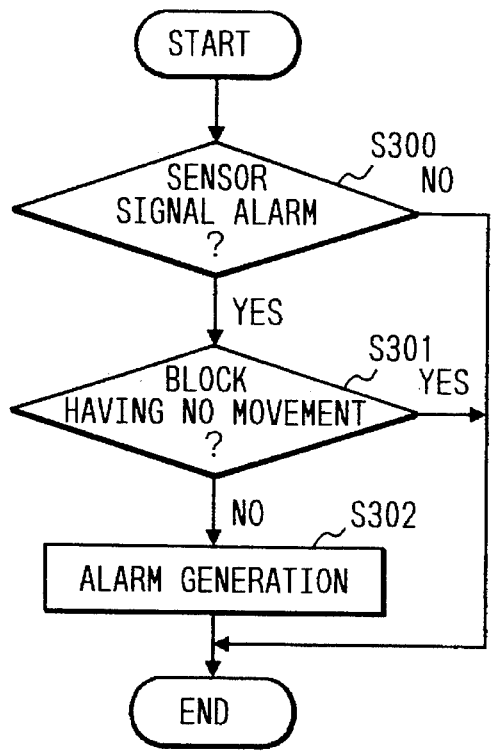
FIG. 6 is a processing flowchart for the laser cutting machine in FIG. 5.

FIG. 6 is a processing flowchart of a method wherein the alarm is invalidated in the command block of the NC program having no movement. In FIG. 6, it is judged in step S300 whether or not the signal from the sensor has exceeded the predetermined range or is indicating the alarm signal because of contact with the workpiece. If the alarm signal is present, it is judged in step S301 whether or not the command block of the NC program currently being executed is a block having no movement. If so, the alarm is not output. If not, the alarm is generated in step S302.

Figure 7:
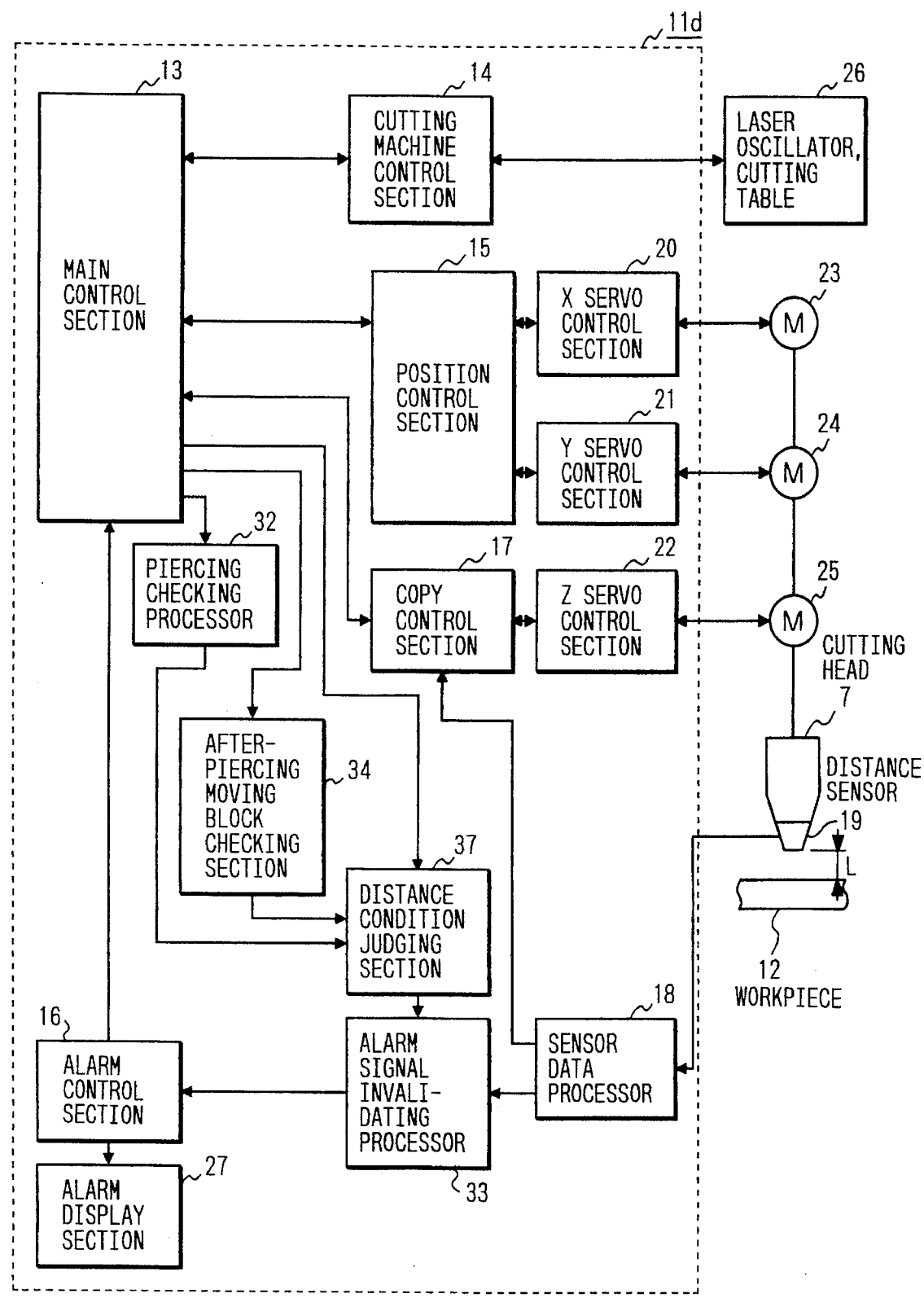
FIG. 7 is a block arrangement diagram illustrating a seventh embodiment of a laser cutting machine in accordance with the present invention.

FIG. 7 is a block diagram showing a laser cutting machine of a seventh embodiment of the present invention, wherein the alarm is kept invalidated from the piercing start until movement is made over a predetermined distance after piercing. A control apparatus 11d, a piercing checking processor 32, an after-piercing moving block checking section 34, a distance condition judging section 37, and an alarm signal invalidation processor 33 are shown. When piercing is in progress, the piercing checking processor 32 outputs to the distance condition judging section 37 a signal which indicates piercing. Also, the after-piercing moving block checking section 34 outputs to the distance condition judging section 37 a signal which indicates the execution of the first moving command block of the NC program after piercing during that execution. On receiving the piercing signal, the distance condition judging section 37 outputs a command signal to the alarm signal invalidating processor 33 to invalidate the alarm signal. When the signal indicating the first moving command block of the NC program after piercing is input subsequently, the distance condition judging section 37 receives the travel distance information up to the present relative to the move command from the main control section 13 and compares it with the preset distance. The command signal is output to invalidate the alarm signal until the travel distance becomes not less than the preset distance. On receiving the alarm signal from the sensor data processor 18, the alarm signal invalidating processor 33 ordinarily gives the signal to the alarm control section 16, but while the invalidating command signal is being input, invalidates the alarm signal and does not transmit the alarm signal to the alarm control section 16. Accordingly, if the sensor data processor 18 outputs the alarm signal, the alarm control section 16 does not give the alarm from the piercing start until the movement is made over the predetermined distance after piercing.

Figure 8:
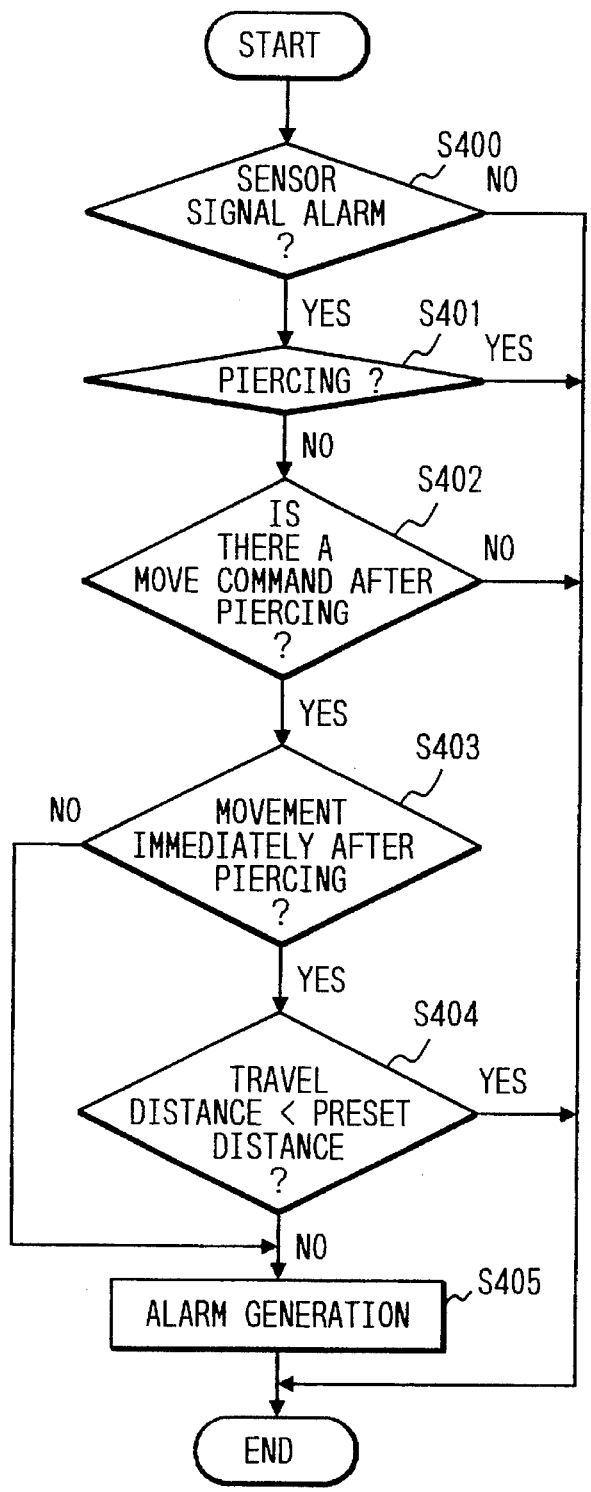
FIG. 8 is a processing flowchart for the laser cutting machine in FIG. 7.

FIG. 8 is a processing flowchart for a method where the alarm is invalidated from the piercing start until movement is made over the predetermined distance after piercing in the laser cutting machine in FIG. 7. As illustrated in FIG. 8, it is judged in step S400 whether or not the signal from the sensor has exceeded the predetermined range or is indicating the alarm signal because of contact with the workpiece. If the alarm signal is present, it is judged in step S401 whether piercing is being performed or not. If piercing is being performed, the alarm is not output. If piercing is not being performed, it is judged in step S402 whether or not there was a move command after piercing. If there was no move command, the alarm is not output. If there was a move command, it is judged in step S403 whether that command is for the first movement after piercing. If it is not the first movement after piercing, the alarm is output in step S405. If it is the first movement after piercing, the travel distance up to the present and the preset distance are compared in step S404. If the travel distance is equal to or longer than the preset distance, the alarm is output in step S405. If the travel distance is shorter than the preset distance, the alarm is not output.

The above embodiments allow for the prevention of the alarm generated by the influence of scattered or accumulated spatters or plasma during piercing. However, when the workpiece is cut off at the end point of cutting and is inclined so as to make contact with the sensor or the workpiece is separated and blown away and makes contact with the sensor instantaneously, the sensor outputs the alarm signal, generating the alarm. An embodiment which prevents the alarm generation in these cases will now be described.

Figure 9:
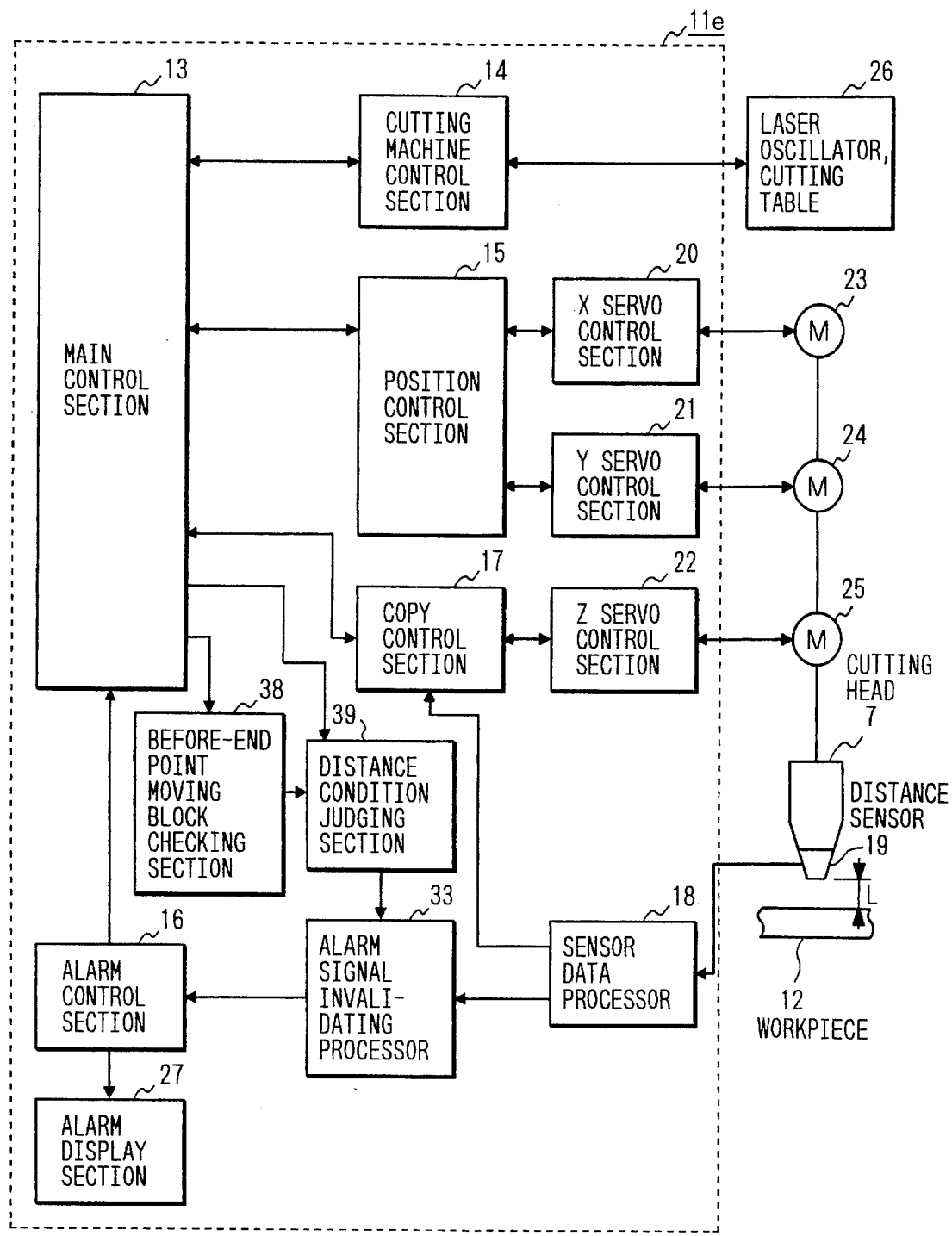
FIG. 9 is a block arrangement diagram illustrating a ninth embodiment of a laser cutting machine in accordance with the present invention.

FIG. 9 illustrates a block diagram of a laser cutting machine of a ninth embodiment of the present invention, wherein the alarm is invalidated over a distance from a point which is a predetermined distance before a cutting end point to the cutting end point. In FIG. 9, a control apparatus 11e, an immediately-before-cutting end point moving block checking section 38, and a distance condition judging section 39 are shown. The immediately-before-cutting end point moving block checking section 38 receives the command executed by the main control section 13 and a pre-read command, i.e., the command to be executed next, and if the pre-read command is a command meaning the end of cutting, judges the preceding move command as a move command immediately before the cutting end point and outputs to the distance condition judging section 39 a signal which indicates the detection of the moving block immediately before the cutting end point. On receiving the signal, the distance condition judging section 39 receives the travel distance information up to the present, relative to the move command from the main control section 13, and compares a remaining distance up to a movement end point (equivalent to the cutting end point) with a preset distance. If the remaining distance is not more than the preset distance, a command signal is output to the alarm signal invalidating processor 33 to invalidate the alarm signal. On receiving the alarm signal from the sensor data processor 18, the alarm signal invalidating processor 33 ordinarily gives that signal to the alarm control section 16, but while the invalidating command signal is being input, invalidates the alarm signal and does not transmit the alarm signal to the alarm control section 16. Accordingly, if the sensor data processor 18 outputs the alarm signal, the alarm control section 16 does not give the alarm over a distance from the point which is a predetermined distance before the cutting end point.

Figure 10:
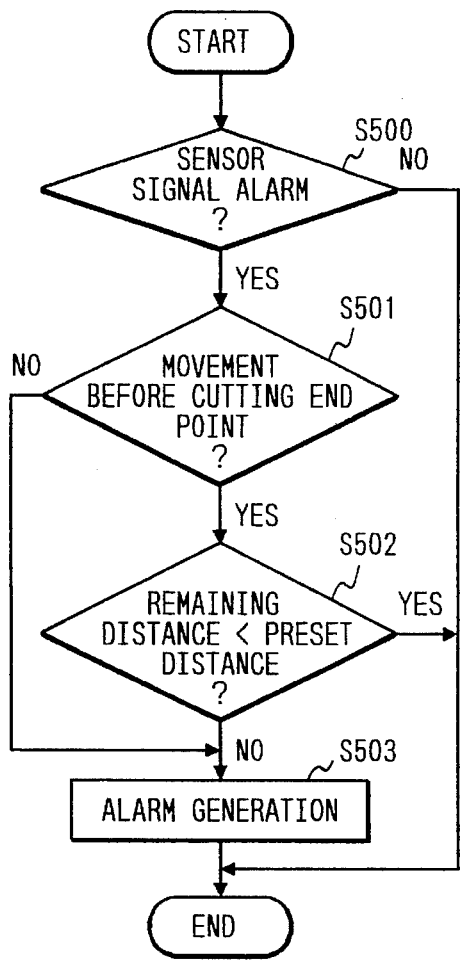
FIG. 10 is a processing flowchart for the laser cutting machine in FIG. 9.

FIG. 10 is a processing flowchart of a method wherein the alarm is invalidated over a distance from a point which is a predetermined distance before the cutting end point to the cutting end point in the laser cutting machine in FIG. 9. In FIG. 10, it is judged in step S500 whether or not the signal from the sensor has exceeded the predetermined range or is indicating the alarm signal because of contact with the workpiece. If the alarm signal is present, it is judged in step S501 whether the movement is that immediately before the cutting end point. If not, the alarm is output in step S503. If so, the remaining distance obtained by subtracting the travel distance up to the present point from the movement end point is compared with the preset distance in step S502. If the remaining distance is equal to or longer than the preset distance, the alarm is output in step S503. If the remaining distance is shorter than the preset distance, the alarm is not output.

Figure 11:
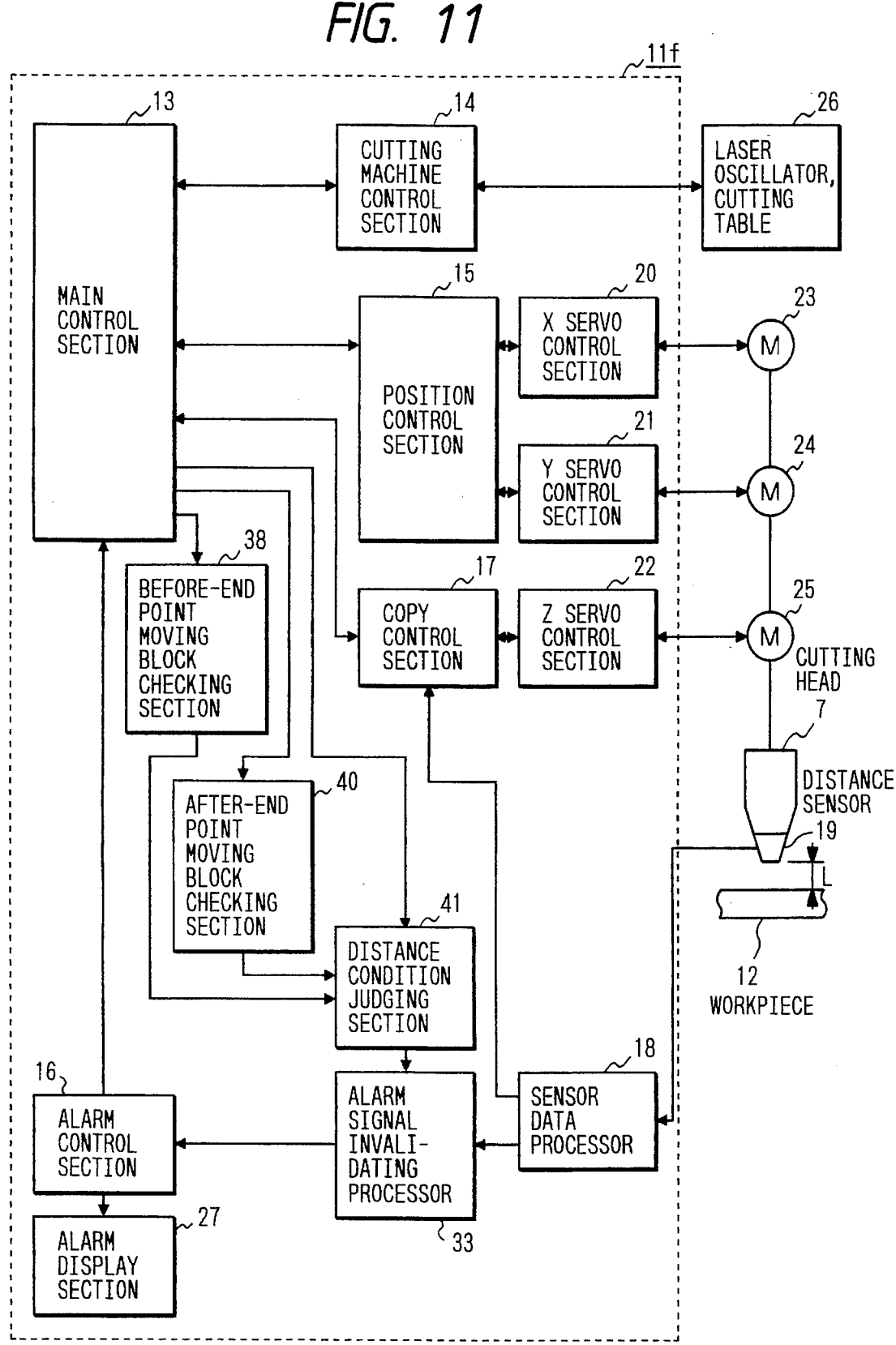
FIG. 11 is a block arrangement diagram illustrating an eleventh embodiment of a laser cutting machine in accordance with the present invention.

FIG. 11 is a block diagram showing a laser cutting machine of an eleventh embodiment of the present invention. The preceding embodiment allows the prevention of the alarm generated when the workpiece cut off immediately before the cutting end point is inclined so as to make contact with the sensor, or when the workpiece is separated and blown away and makes contact with the sensor instantaneously. However, if the inclined workpiece remains in contact with the sensor, there is a possibility that the alarm is generated by the sensor contact alarm signal as soon as the next movement is started. Hence, the alarm must be kept invalidated over a distance from a point a predetermined distance before the cutting end point to a point which is a predetermined distance after the arrival at the cutting end point. This goal is achieved by the eleventh embodiment as shown in FIG. 11. Referring to FIG. 11, a control apparatus 11f, an immediately-before-cutting end point moving block checking section 38, an immediately-after-cutting end point moving block checking section 40, a distance condition judging section 41, and an alarm signal invalidating processor 33 are shown. The immediately-before-cutting end point moving block checking section 38 outputs to the distance condition judging section 41 a signal which indicates the presence of a moving command block of the NC program immediately before the cutting end point. The immediately-after-cutting end point moving block checking section 40 receives the command executed by the main control section 13, judges the move command after the command meaning the cutting end as a move command immediately after the cutting end point, and outputs to the distance condition judging section 41 a signal which indicates the detection of the moving block immediately after the cutting end point.

On receiving the signal that indicates the moving block immediately before the cutting end point, the distance condition judging section 41 receives the travel distance information up to the present point relative to the move command from the main control section 13 and compares a remaining distance up to the movement end point (equivalent to the cutting end point) with the preset distance. When the remaining distance has become not more than the preset distance, the command signal is output to the alarm signal invalidating processor 33 to invalidate the alarm signal. Subsequently, when the signal indicating the moving block immediately after the cutting end point is input, the distance condition judging section 41 receives the travel distance information up to the present point relative to the move command from the main control section 13 and compares it with the preset distance. The command signal is continuously output to invalidate the alarm signal until the travel distance becomes not less than the preset distance. On receiving the alarm signal from the sensor data processor 18, the alarm signal invalidating processor 33 ordinarily gives that signal to the alarm control section 16, but while the invalidating command signal is being input, invalidates the alarm signal and does not transmit the alarm signal to the alarm control section 16. Accordingly, if the sensor data processor 18 outputs the alarm signal, the alarm control section 16 does not give the alarm over a distance from the point a predetermined distance before the cutting end point to the point a predetermined distance after the arrival at the cutting end point.

Figure 12:
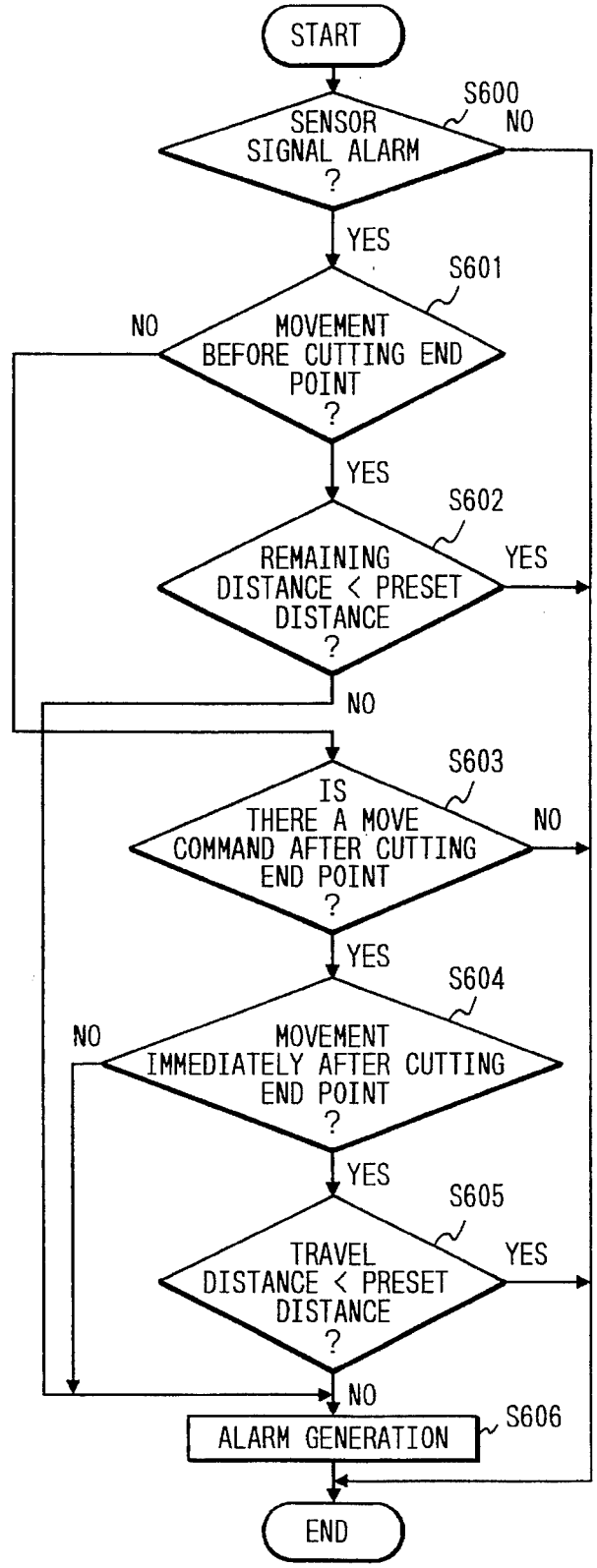
FIG. 12 is a processing flowchart for the laser cutting machine in FIG. 11.

FIG. 12 is a processing flowchart for a method where the alarm is invalidated over a distance from the point which is the predetermined distance before the cutting end point to the point the predetermined distance after the arrival at the cutting end point in the embodiment of the laser cutting machine in FIG. 11. In FIG. 12, it is judged in step S600 whether or not the signal from the sensor has exceeded the predetermined range or is indicating the alarm signal because of contact with the workpiece. If so, it is judged in step S601 whether the movement is immediately before the cutting end point. If not, the execution shifts to step S603. If so, the remaining distance is obtained by subtracting the travel distance up to the present point from the movement end point and is compared with the preset distance in step S602. If the remaining distance is equal to or longer than the preset distance, the processing moves to step S606. If the remaining distance is shorter than the preset distance, the alarm is not output. In step S603, it is judged whether or not there was a move command after the arrival at the cutting end point. If there was no move command, the alarm is not output. If there was a move command, it is judged in step S604 whether that command is for the first movement after the arrival at the cutting end point. If it is not the first movement after the arrival at the cutting end point, the alarm is output in step S606. If it is, the travel distance up to the present point is compared with the preset distance in step S605. If the travel distance is equal to or longer than the preset distance, the alarm is output in step S606. If the travel distance is shorter than the preset distance, the alarm is not output.

Figure 13:
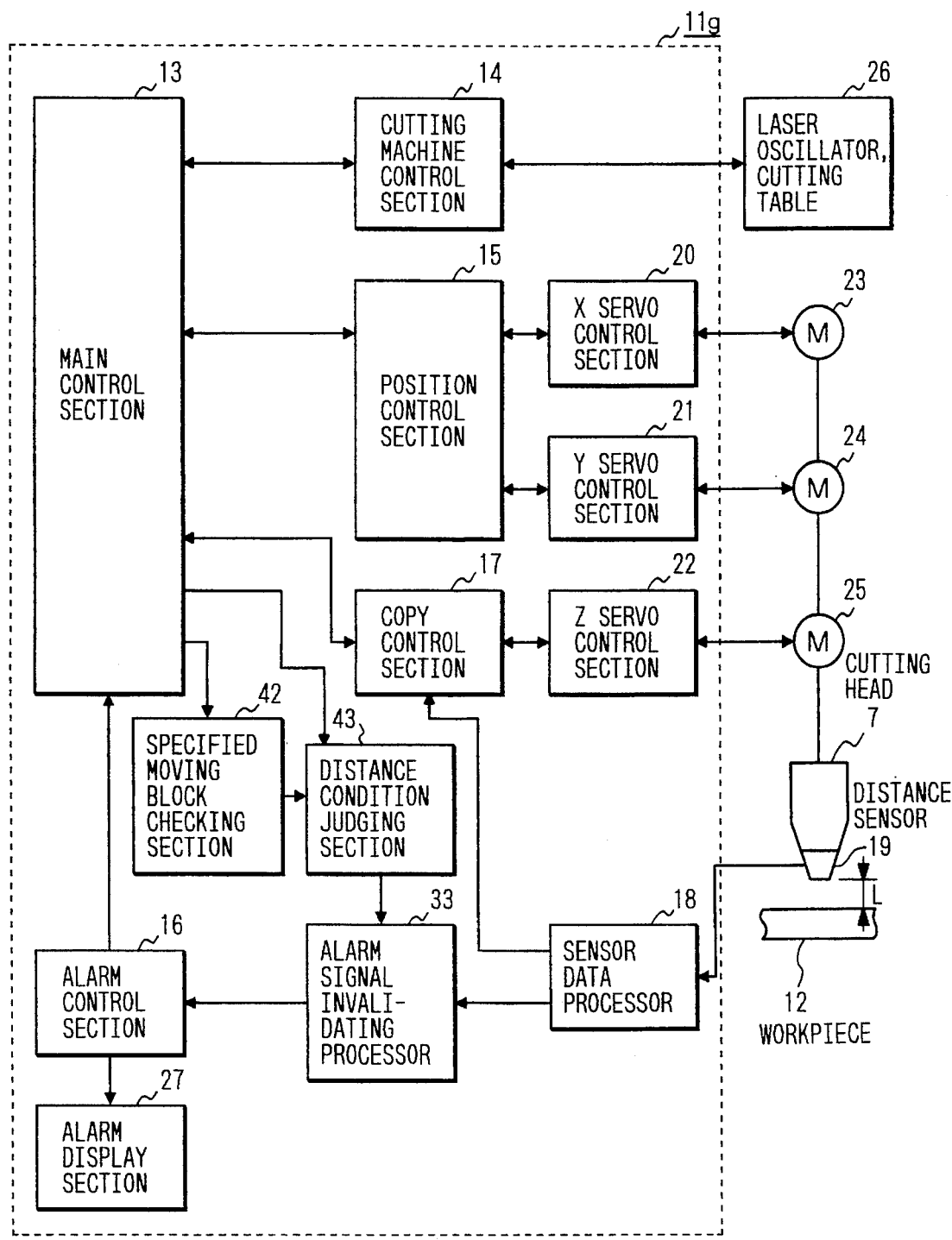
FIG. 13 is a block arrangement diagram illustrating a thirteenth embodiment of a laser cutting machine in accordance with the present invention.

FIG. 13 is a block diagram showing a laser cutting machine of a thirteenth embodiment of the present invention. The prior embodiments allow the prevention of the unnecessary alarm generated at the time piercing or cutting ends. Depending on the cutting shape and cutting conditions, however, plasma and/or spatters easily occur in a specific moving command block of the NC program midway during cutting and the alarm may take place and cutting stops in that block. An embodiment which invalidates the alarm in the predetermined travel range of a pre-specified block is shown in FIG. 13. Referring to FIG. 13, a control apparatus 11g, a specified block checking section 42, a distance condition judging section 43, and an alarm signal invalidating processor 33 are shown. The specified block checking section 42 receives the command executed by the main control section 13, and if it is the specified block, outputs to the distance condition judging section 33 a signal which indicates the specified block has been detected.

On receiving the signal that indicates the specified block, the distance condition judging section 43 receives the travel distance information up to the present point relative to the move command from the main control section 13 and compares the remaining distance up to the movement end point with the preset distance. When the remaining distance is not more than the preset distance, the command signal is output to the alarm signal invalidating processor 33 in order to invalidate the alarm signal. On receiving the alarm signal from the sensor data processor 18, the alarm signal invalidating processor 33 ordinarily gives that signal to the alarm control section 16, but while the invalidating command signal is being input, the alarm signal invalidating processor 33 invalidates the alarm signal and does not transmit the alarm signal to the alarm control section 16. Accordingly, if the sensor data processor 18 outputs the alarm signal, the alarm control section 16 does not give the alarm over a travel distance from a point which is the predetermined distance before the end point of the specified command block of the NC program to the end point.

Figure 14:
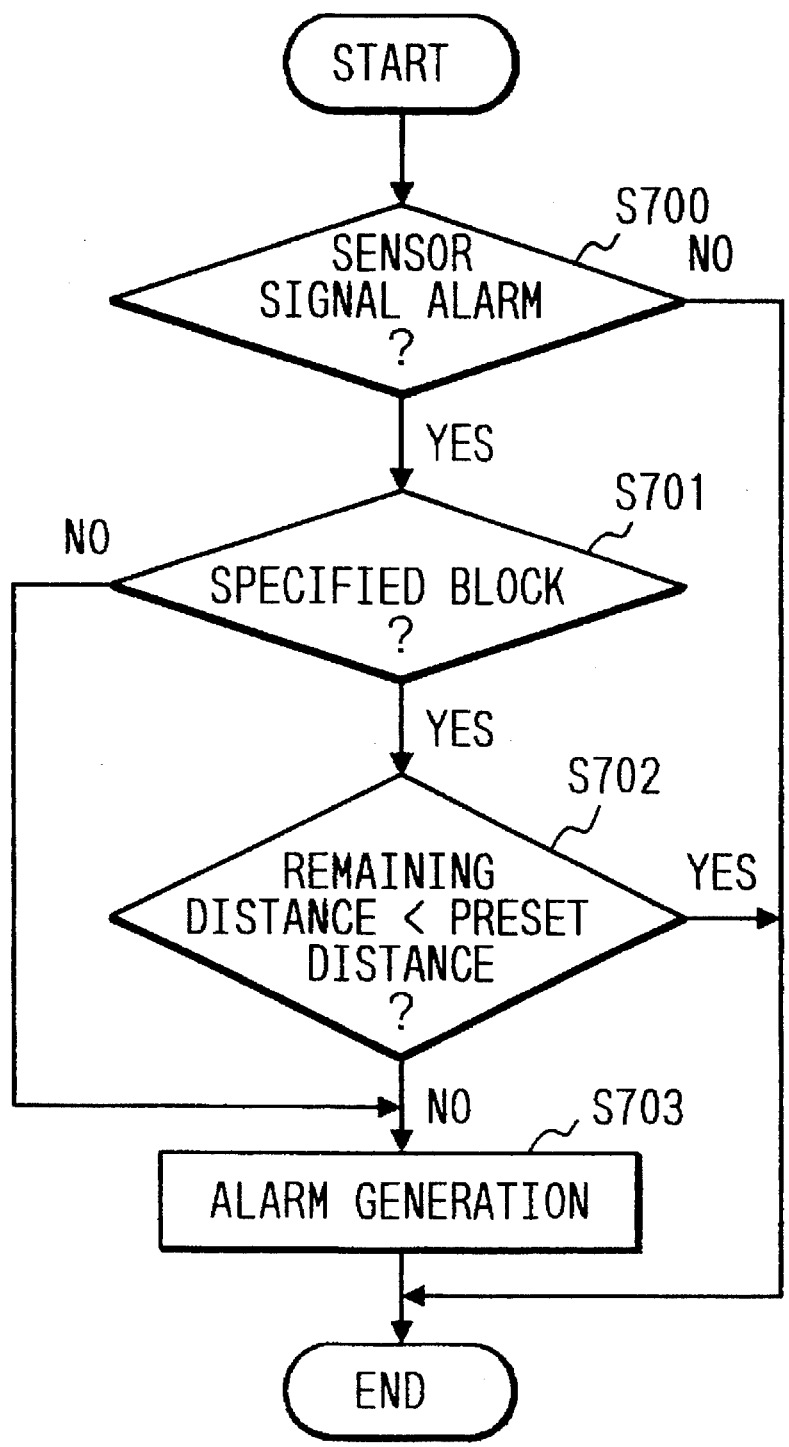
FIG. 14 is a processing flowchart for the laser cutting machine in FIG. 13.

FIG. 14 is a flowchart for a method where the alarm is invalidated over a distance from the point a predetermined distance before the end point of the specified block to the end point in the embodiment of the laser cutting machine in FIG. 13. In FIG. 14, step S700 judges whether or not the signal from the sensor has exceeded the predetermined range or is indicating the alarm because of contact with the workpiece. If so, it is judged in step S701 whether the specified block is being executed or not. If the specified block is not being executed, the alarm is output in step S703. If the specified block is being executed, the remaining distance is obtained by subtracting the travel distance up to the present point from the movement end point and is compared with the preset distance in step S702. If the remaining distance is equal to or longer than the preset distance, the alarm is output in step S703. If the remaining distance is shorter than the preset distance, the alarm is not output. Whether the specified block is being executed or not can be judged by whether or not the program command read and executed by the main control section has a specified command code pre-provided for the specified block in the program. Also, when all moving blocks are defined as specified blocks without any specified codes being pre-provided, judgment can be made by whether the command is a move command or not. In this case, while the alarm is invalidated in all the moving blocks independently of the blocks where the alarm occurs easily, it does not pose a problem if a short distance is preset. Also, depending on the alarm generation method, the distance condition judging section 43 may judge by the travel distance instead of the remaining distance.

Figure 15:
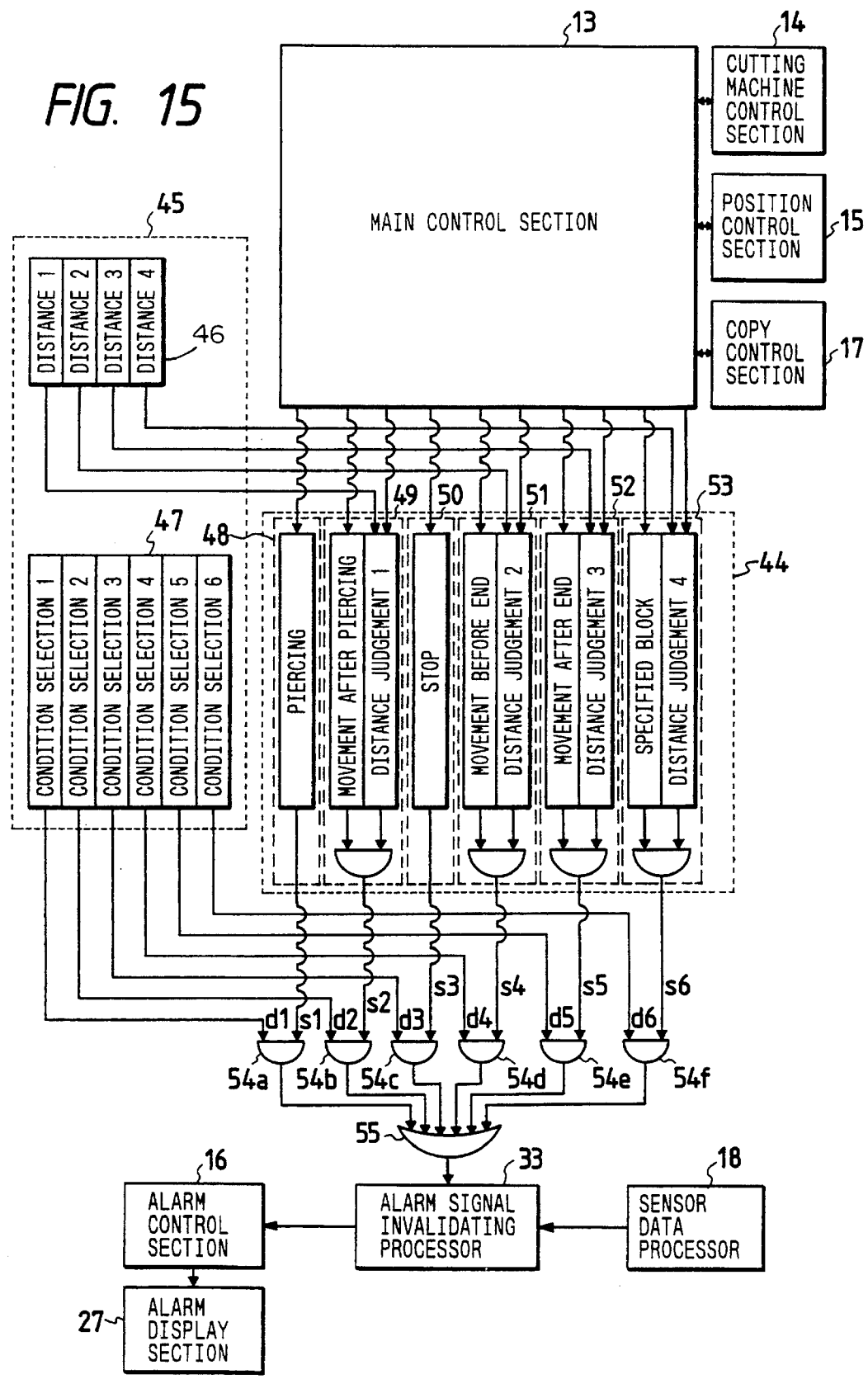
FIG. 15 is a block arrangement diagram illustrating a fifteenth embodiment of a laser cutting machine in accordance with the present invention.
Figure 16:
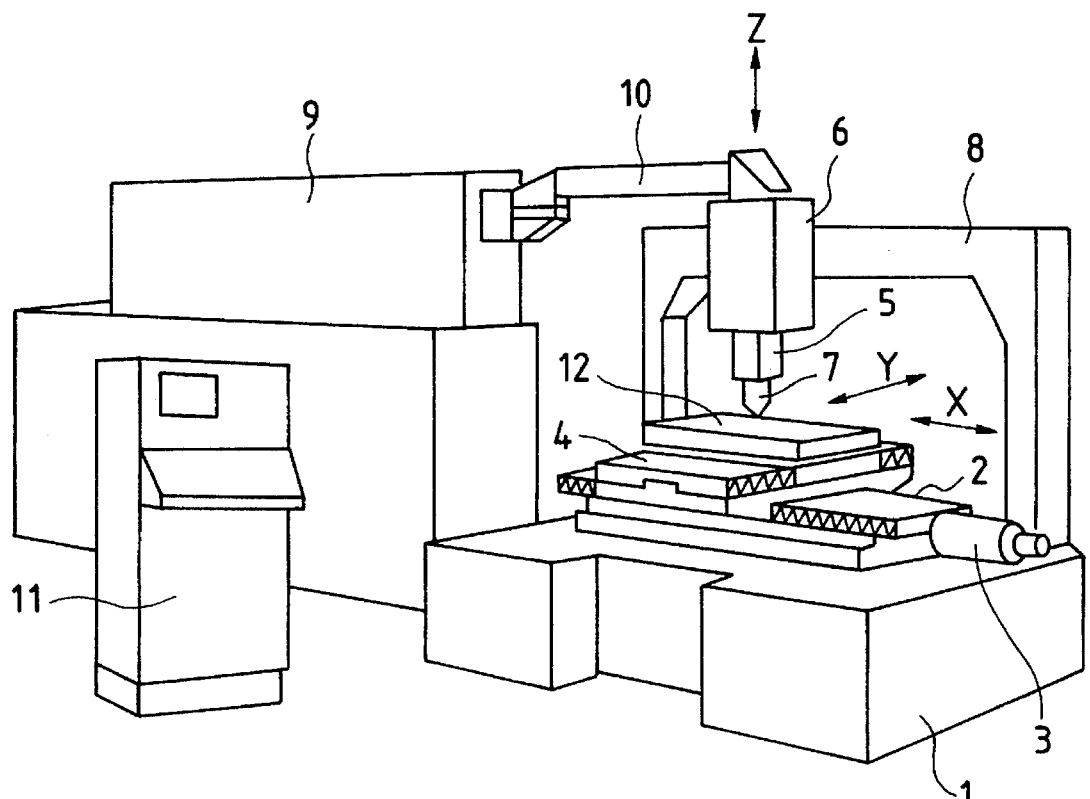
FIG. 16 is an external view of a laser cutting machine known in the conventional art.

In the above embodiments, the means for preventing the unnecessary alarm have been described according to occurrences such as piercing and cutting end. In actual cutting, however, since cutting states and portions where the alarm occurs easily depend on the cutting conditions, cut material, etc., it is desired to selectively validate said conditions. This is because, if all of said conditions are kept valid, there is a possibility that the cutting states and portions where the alarm is invalidated may increase and a necessary alarm may be invalidated. FIG. 15 illustrates a laser cutting machine of a fifteenth embodiment of the present invention which is equipped with a plurality of condition judging sections which judge whether the alarm signal is invalidated or not and a condition setting section which sets which conditions are made valid as invalidating means.

In FIG. 15, a condition judging section 44, a condition setting section 45, a distance setting section 46 which sets a distance employed by the condition judging section for distance judgement, a condition selecting section 47 which optionally selects and sets which condition of the condition judging section is made valid as the invalidating means, and judging sections 48–53, corresponding to conditions 1–6 in the condition judging section are shown. The condition 1 judging section 48 judges whether piercing is being performed or not, and if piercing is being carried out, judges that the invalidating condition has been established and outputs a signal to an AND gate 54a (switches a signal s1 high). The condition 2 judging section 49 judges whether or not the movement is that after piercing and makes a distance judgement 1. If the movement is that after piercing and the travel distance is not more than a distance 1 set by the distance setting section 46, the condition 2 judging section 49 judges that the invalidating condition has been established and outputs a signal to an AND gate 54b (switches a signal s2 high). The condition 3 judging section 50 judges whether the command block of the NC program requires movement or not, and if the block has no movement, judges that the invalidating condition has been established and outputs a signal to an AND gate 54c (switches a signal s3 high). The condition 4 judging section 51 judges whether or not the movement is that immediately before the cutting end and makes a distance judgement 2. If the movement is that immediately before the cutting end and the remaining travel distance is not more than a distance 2 set by the distance setting section 46, the condition 4 judging section 51 judges that the invalidating condition has been established and outputs a signal to an AND gate 54d (switches a signal s4 high).

The condition 5 judging section 52 judges whether or not the movement is that immediately after the cutting end and makes a distance judgement 3. If the movement is that immediately after the cutting end and the remaining travel distance is not more than a distance 3 set by the distance setting section 46, the condition 5 judging section 52 judges that the invalidating condition has been established and outputs a signal to an AND gate 54e (switches a signal s5 high). The condition 6 judging section 53 judges whether the block is a specified one or not and makes a distance judgement 4. If movement is made in the specified block and the remaining travel distance is not more than a distance 4 set by the distance setting section 46, the condition 6 judging section 53 judges that the invalidating condition has been established and outputs a signal to an AND gate 54f (switches a signal s6 high). In the meantime, signals corresponding to the conditions selected and set as valid as the invalidating conditions in the condition selecting section 47 are output to the AND gates 54a to 54f (signals d1 to d6 are switched high). Accordingly, only when a condition has been judged as established by the condition judging section 44 and that condition has been selected and set in the condition selecting section 47, the corresponding signal passes the corresponding AND gate and is input to an OR gate 55. If an output has been provided by any of the AND gates 54a to 54f, the OR gate 55 outputs a command signal to the alarm signal invalidating processor 33 to invalidate the alarm signal. When receiving the alarm signal from the sensor data processor 18, the alarm signal invalidating processor 33 ordinarily gives that signal to the alarm control section 16, but while the invalidating command signal is being input, invalidates the alarm signal and does not transmit the alarm signal to the alarm control section 16. Accordingly, if the sensor data processor 18 outputs the alarm signal, the alarm control section 16 does not give the alarm when any one of the conditions selected and set in the condition selecting section 47 has been established in the condition judging section 44. The number of conditions selected by the condition selecting section 47 may either be one or a plurality. Also, the number of conditions judged by the condition judging section 44 may either be one or a plurality.

It will be appreciated that the two-dimensional laser cutting machine employed as an example in said embodiments may also be a three-dimensional laser cutting machine to produce the same effects. It will also be appreciated that the laser cutting machine having the copy function used as an example in the embodiments above may be a laser cutting machine having or using no copy function and have identical effects. It will also be appreciated that the distance sensor may be of any type such as a differential transformer type or an optical type or may be a sensor which cannot measure a distance but detects only contact with the workpiece and outputs the alarm signal to have the identical effects.

What is claimed is:

1. A laser cutting machine having a laser oscillator, an optical condenser system for directing a laser beam output from said laser oscillator onto a workpiece, a cutting head for holding said optical condenser system therein, a distance measuring means for measuring a distance between said cutting head and said workpiece, an alarm signal output section for judging an excess of an output signal of said distance measuring means over a predetermined range as an alarm state and providing an alarm signal, an alarm display section for receiving the alarm signal from said alarm signal output section and displaying an alarm, and an alarm signal invalidating means for invalidating said alarm signal, said laser cutting machine comprising:

a condition setting section for selecting an alarm signal invalidating condition under which said alarm signal is invalidated;

a condition judging section for judging whether an alarm signal invalidating condition has been established; and means for comparing the selected alarm signal invalidating condition selected by said condition setting section with the alarm invalidating condition established by said condition judging section to judge whether said alarm signal is invalidated.

2. The laser cutting machine as defined in claim 1, wherein the condition judging section includes a judging section for judging at least one of:

(1) whether a workpiece at a current position is being pierced;

(2) whether the current position is in a command block of a numerical control program immediately after piercing and is within a preset distance from a piercing point;

(3) whether the current position is in a command block of a numerical control program having no movement;

(4) whether the current position is in a command block of a numerical control program immediately before an end of cutting and is within a preset distance from a cutting end point;

(5) whether the current position is in a command block of a numerical control program immediately after the end of the cutting and is within a preset distance from the cutting end point; and (6) whether the current position is in a command block of a numerical control program preset by the condition setting section and is within a preset distance from an end point of said preset command block.

3. The laser cutting machine as defined in claim 2, wherein the condition setting section includes a setting section for setting as the alarm signal invalidating condition any combination of:

(1) whether the laser cutting machine is piercing;

(2) whether the laser cutting machine is in a command block of a numerical control program immediately after piercing and is within a preset distance from a piercing point;

(3) whether the laser cutting machine is in a command block of a numerical control program having no movement;

(4) whether the laser cutting machine is in a command block of a numerical control program immediately before an end of cutting and is within a preset distance from a cutting end point;

(5) whether the laser cutting machine is in a command block of a numerical control program immediately after an end of a cutting and is within a preset distance from a cutting end point; and (6) whether the laser cutting machine is in a command block of a numerical control program preset by the condition setting section and is within a preset distance from an end point of said preset block.

4. The laser cutting machine as defined in claim 3, wherein the condition setting section includes a distance setting section for setting different preset distances employed by said condition judging section for distance judgment.

5. The laser cutting machine as defined in claim 2, wherein the condition setting section includes a setting section for setting as the alarm signal invalidating condition at least one of:

(1) whether the laser cutting machine is piercing;

(2) whether the laser cutting machine is in a command block of a numerical control program immediately after piercing and is within a preset distance from a piercing point;

(3) whether the laser cutting machine is in a command block of a numerical control program having no movement;

(4) whether the laser cutting machine is in a command block of a numerical control program immediately before an end of a cutting and is within a preset distance from a cutting end point;

(5) whether the laser cutting machine is in a command block of a numerical control program immediately after the end of cutting and is within a preset distance from a cutting end point; and (6) whether the laser cutting machine is in a command block of a numerical control program preset by the condition setting section and is within a preset distance from an end point of said preset command block.

6. The laser cutting machine as defined in claim 5, wherein the condition setting section includes a distance setting section for setting different preset distances employed by said condition judging section for distance judgement.

* * * * *